Dec. 17, 1940.  J. M. BLANEY  2,224,947
FILM PROCESSING APPARATUS
Filed Feb. 21, 1938   11 Sheets-Sheet 7
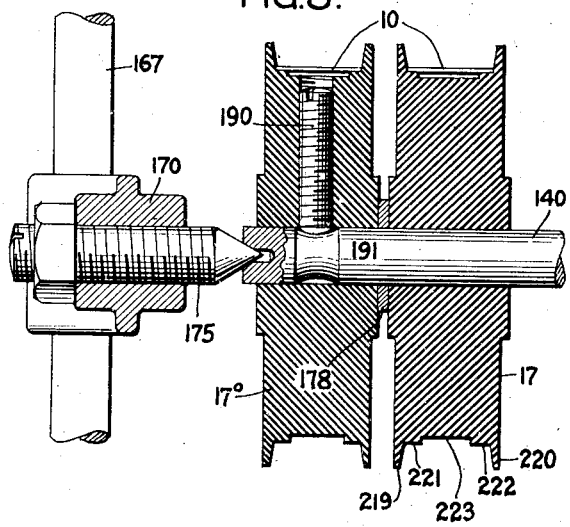
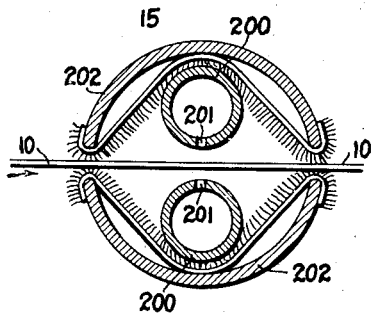
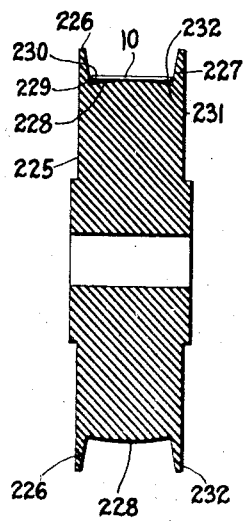
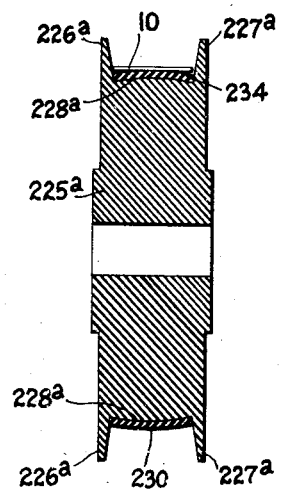
INVENTOR
Jesse M. Blaney
BY
Edwards, Bower & Poal
ATTORNEYS Dec. 17, 1940.  J. M. BLANEY  2,224,947
FILM PROCESSING APPARATUS
Filed Feb. 21, 1938  11 Sheets-Sheet 8
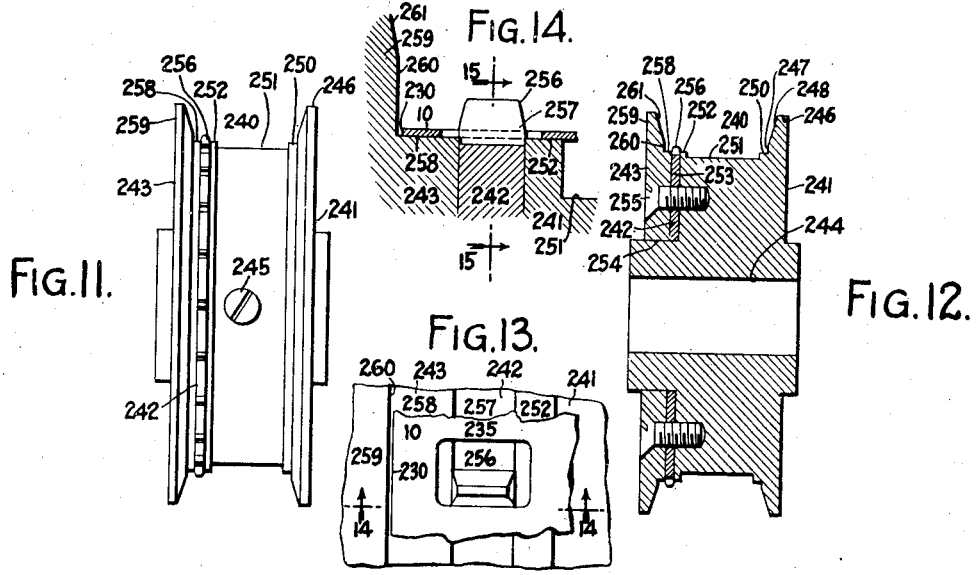
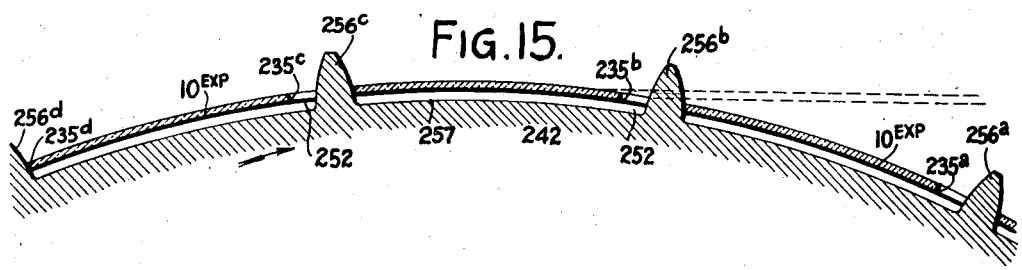
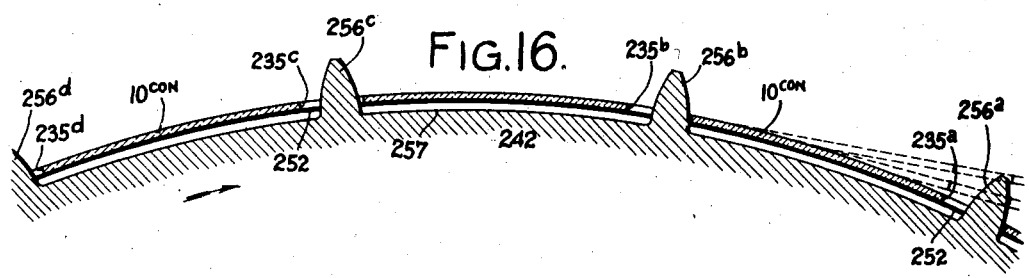
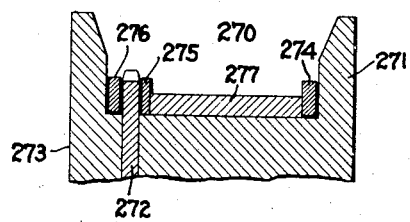
INVENTOR
Jesse M. Blaney
BY
Edwards, Bower & Pool
ATTORNEYS

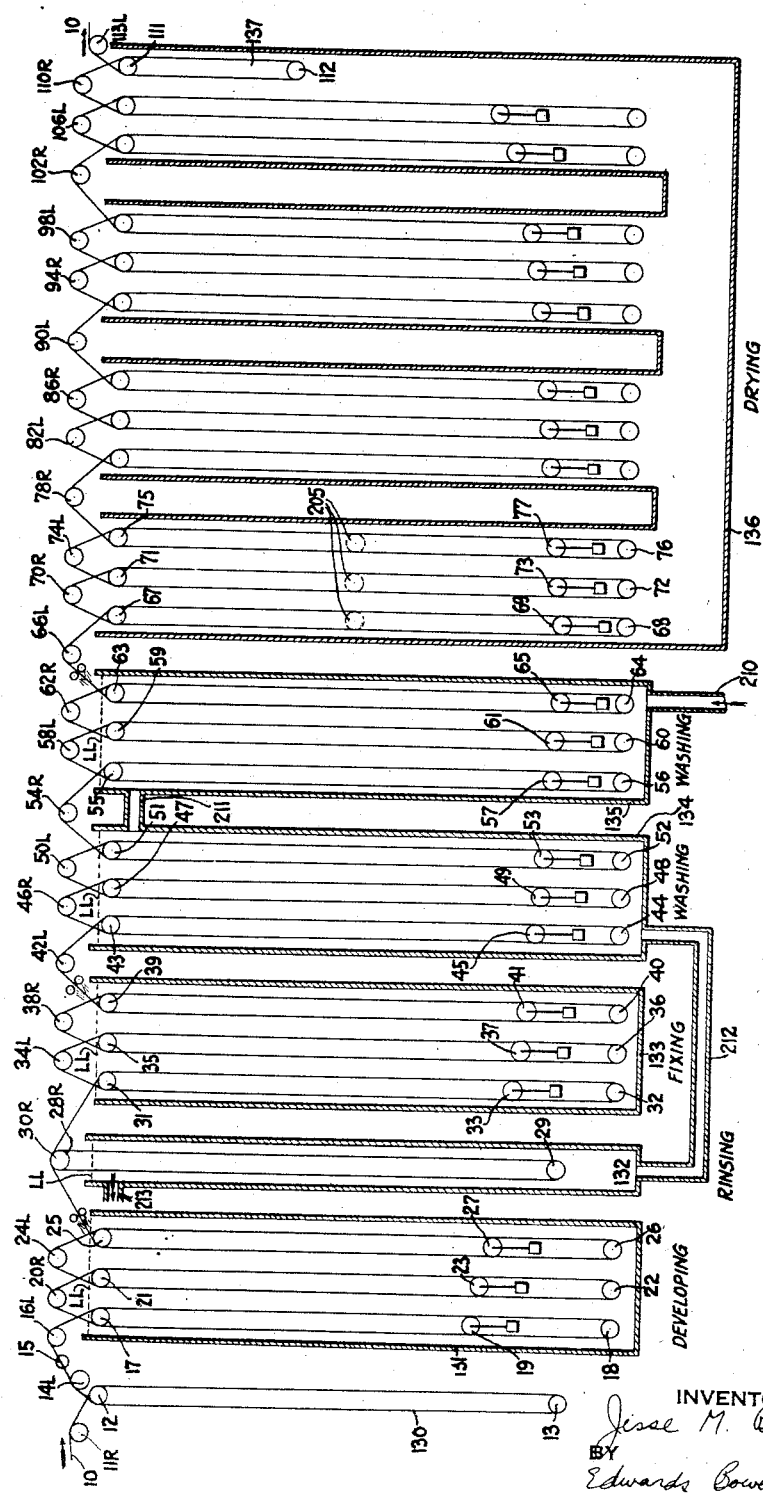

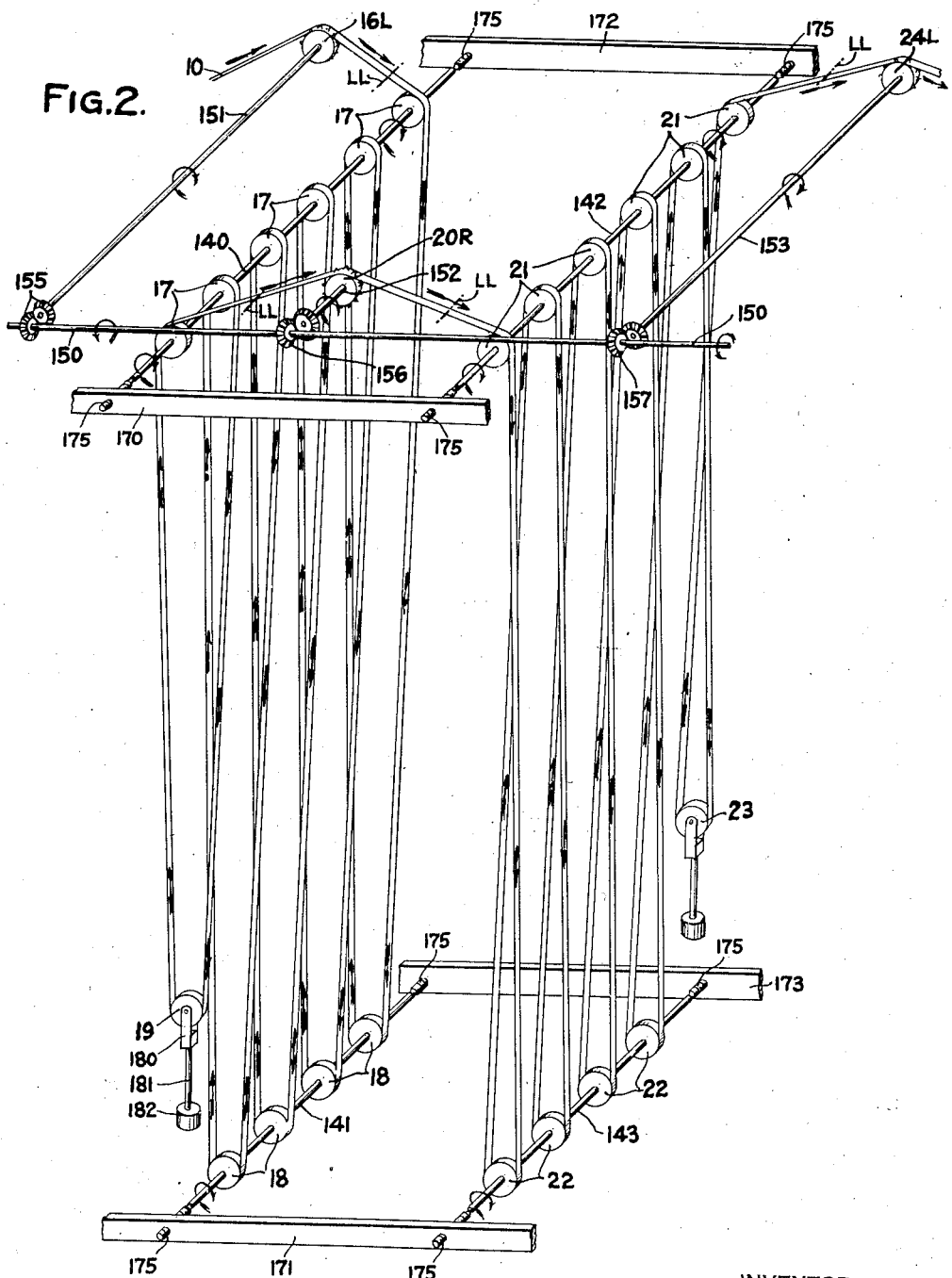

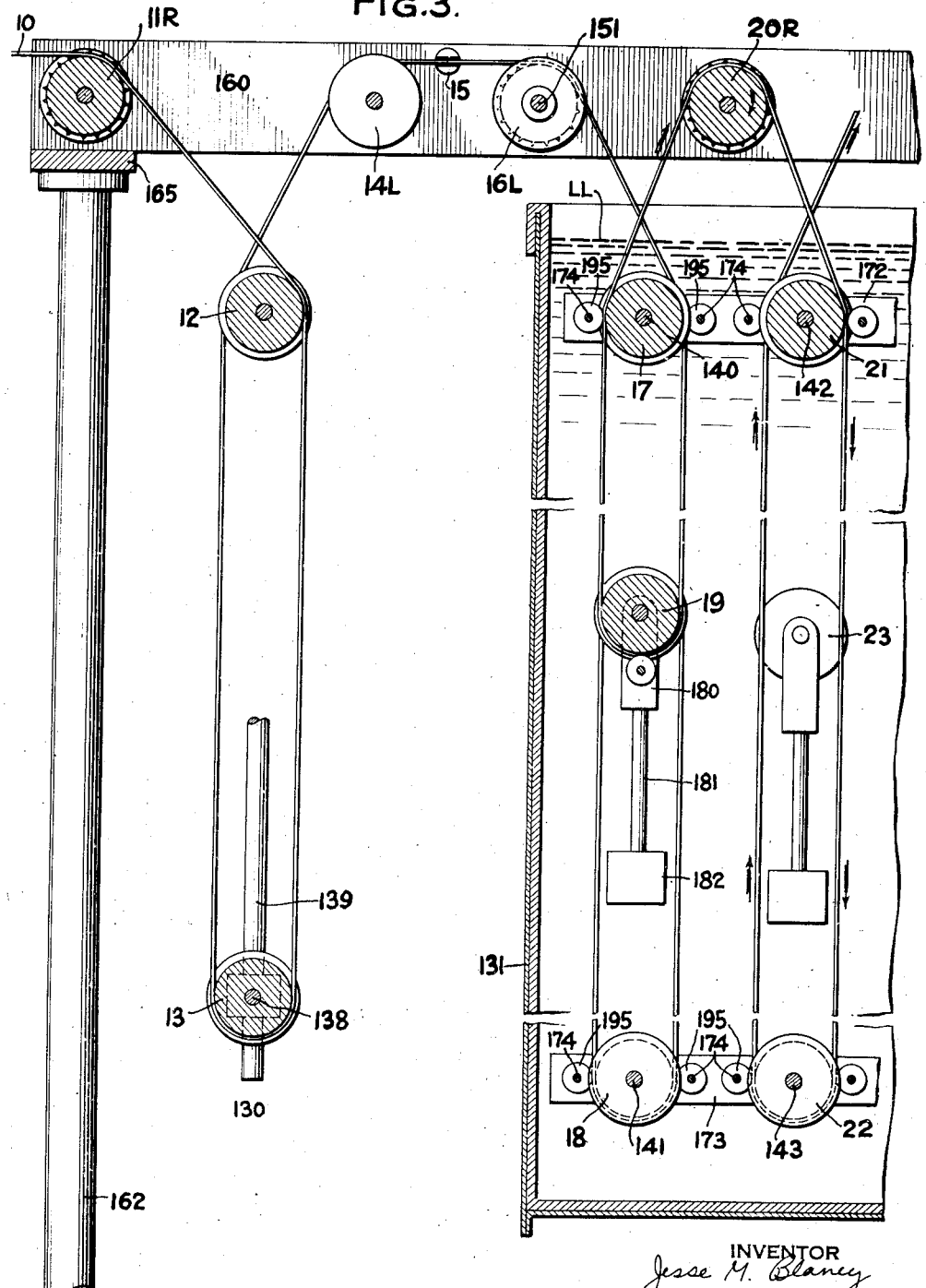

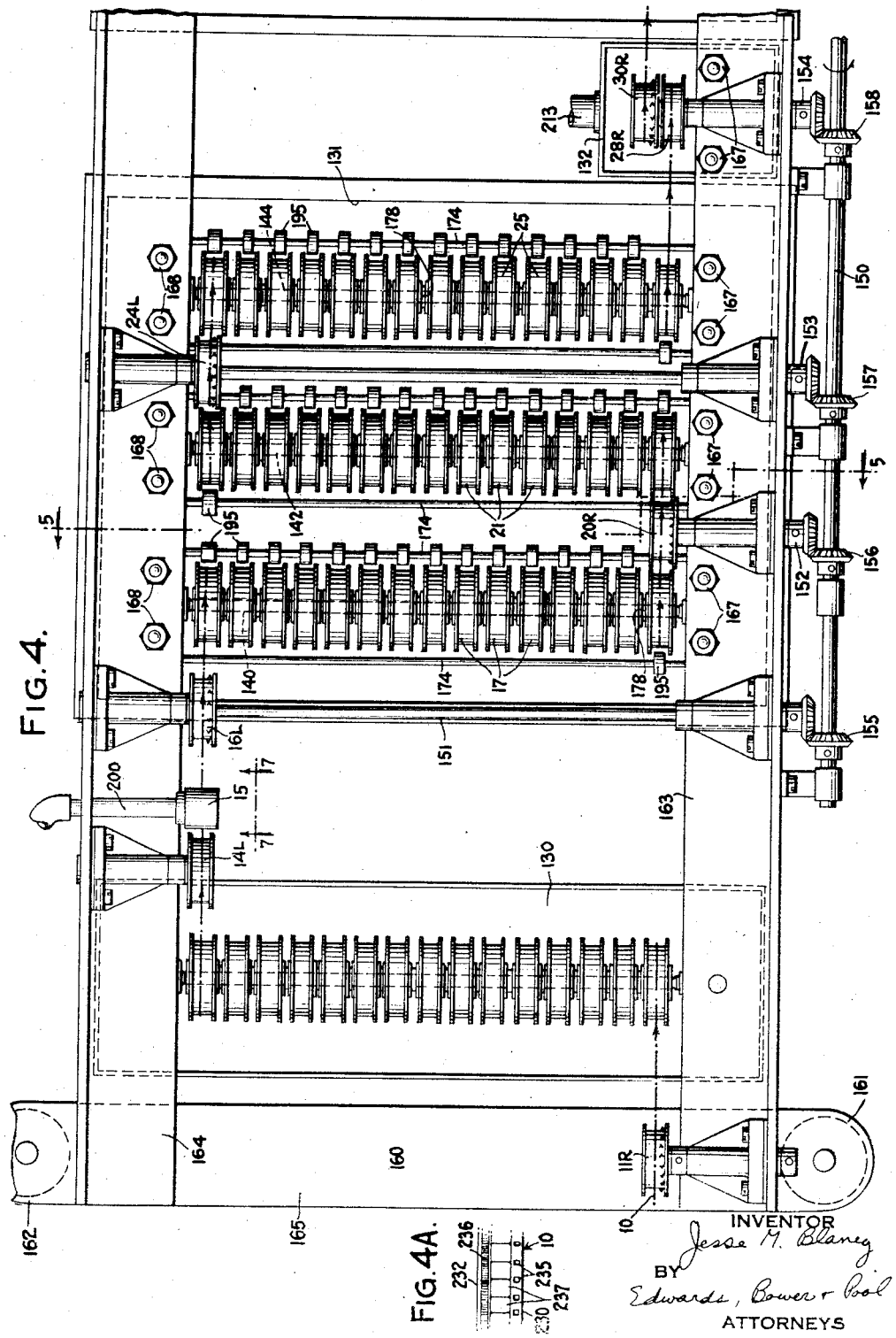

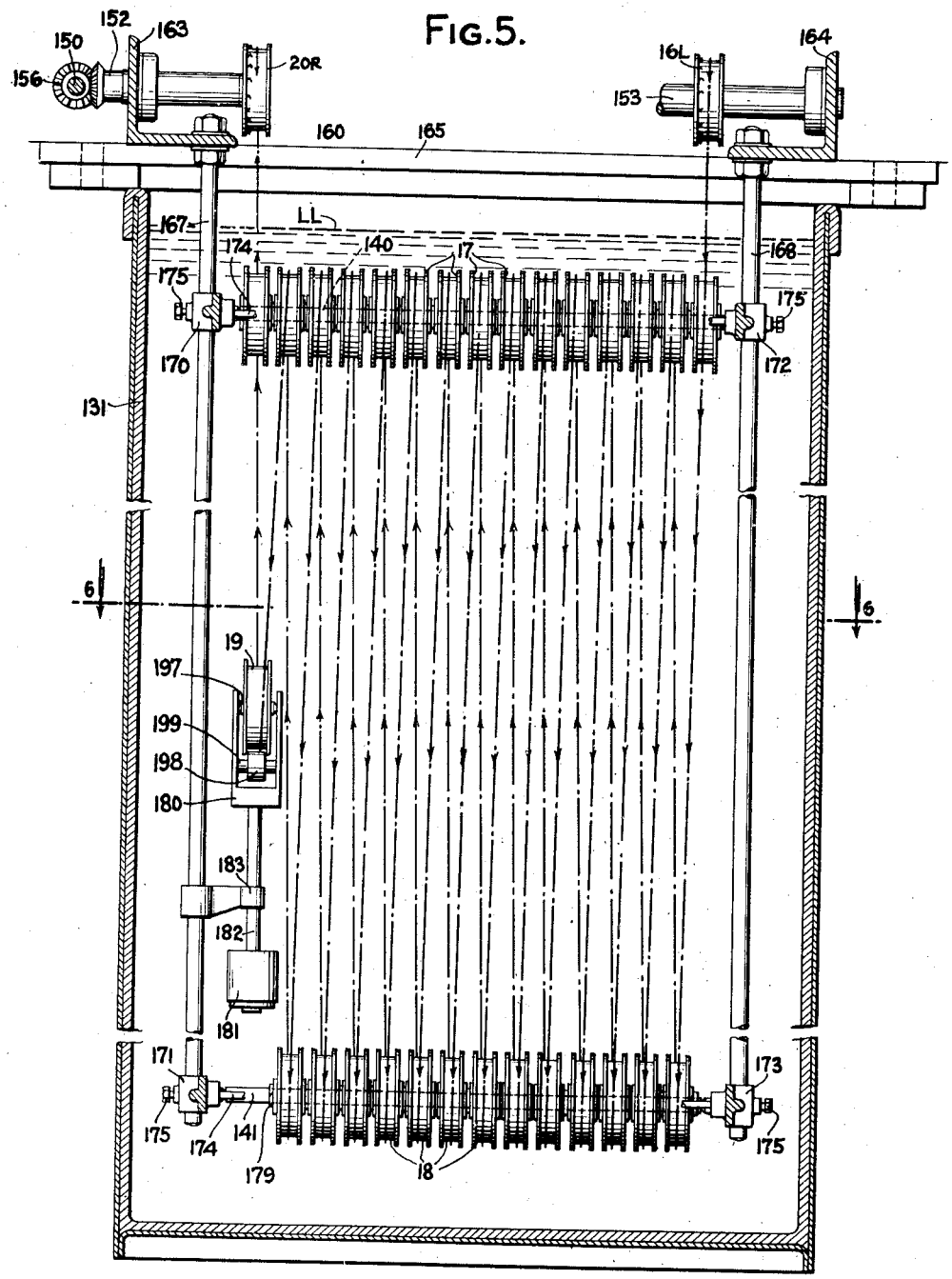

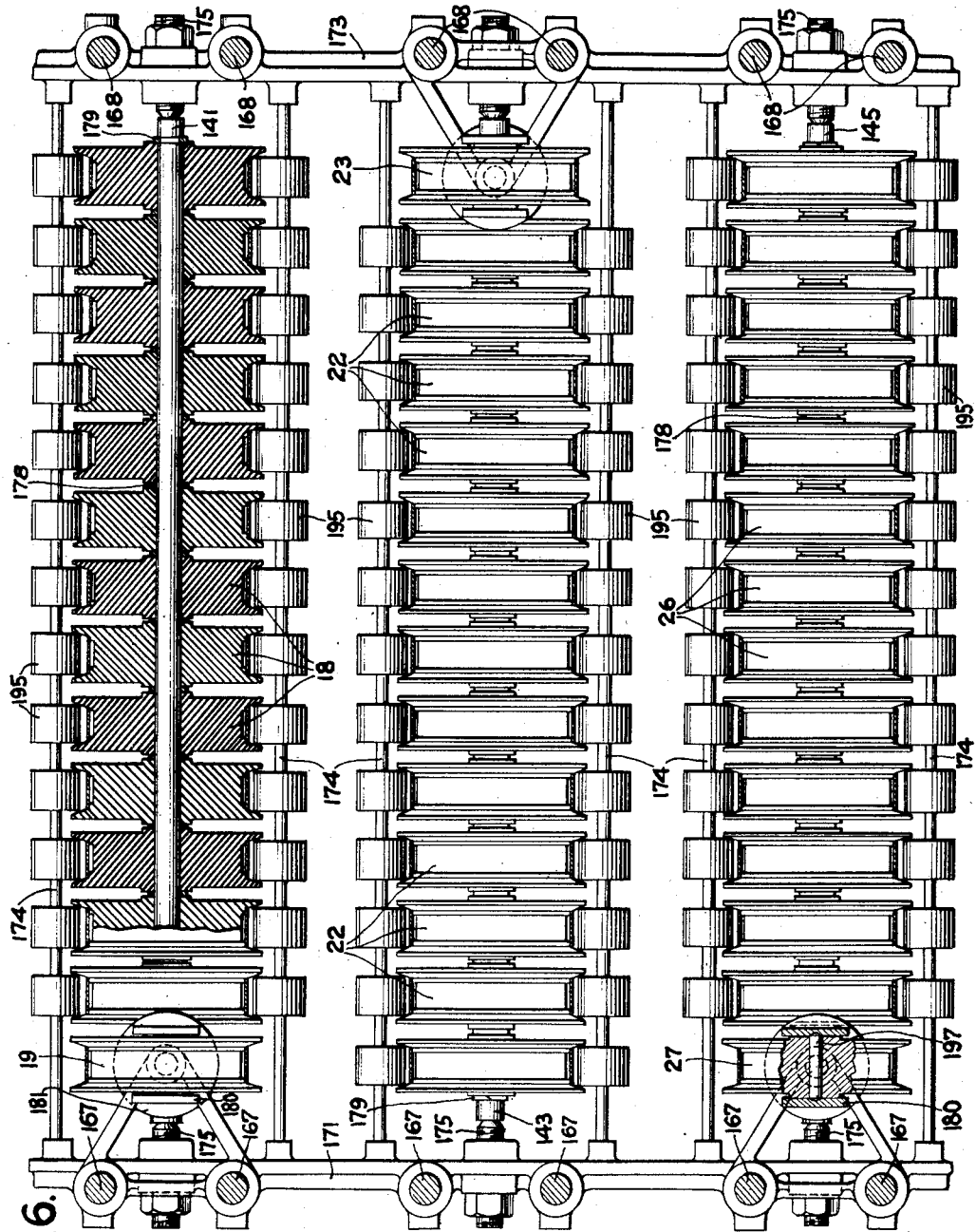

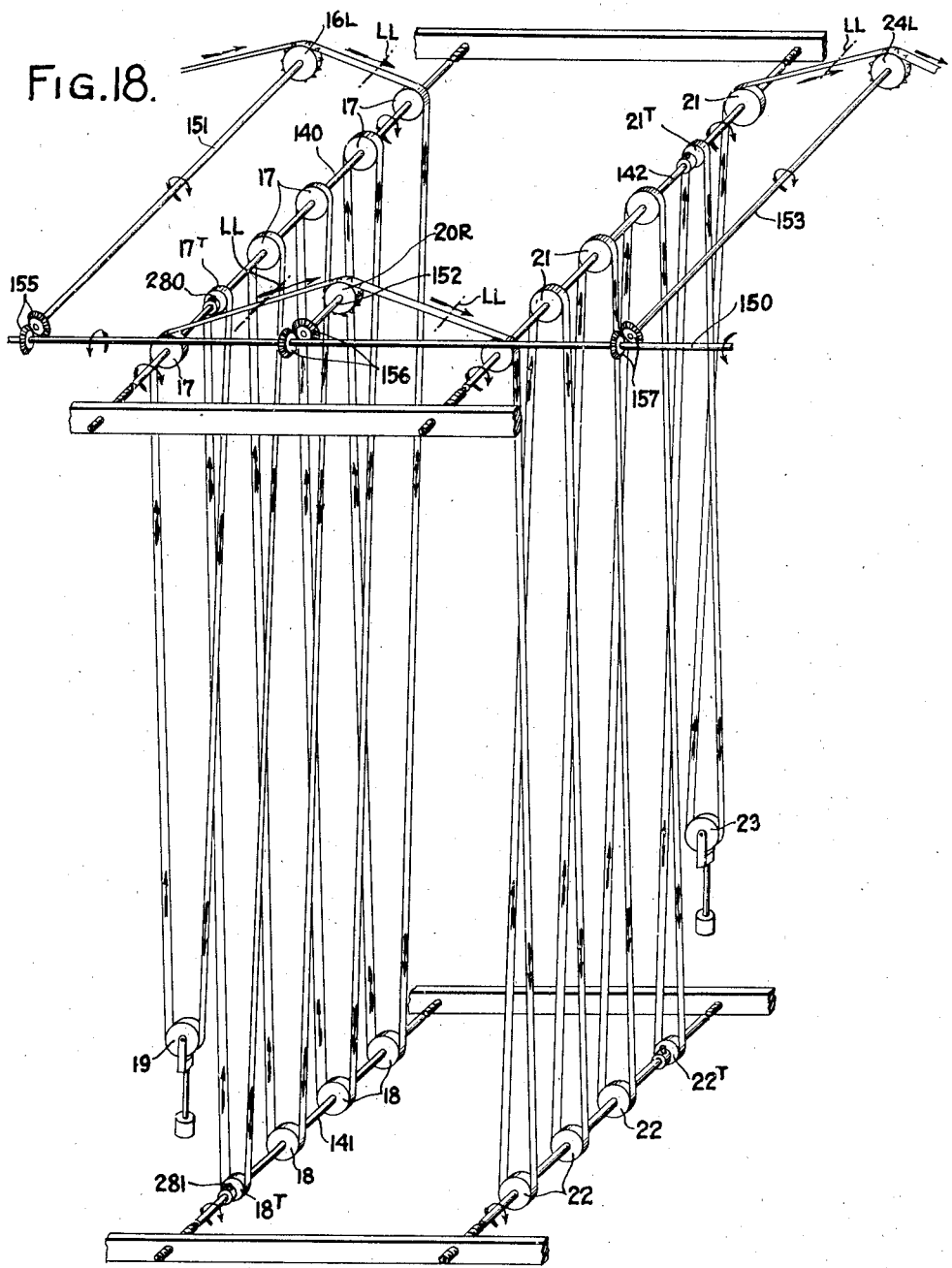

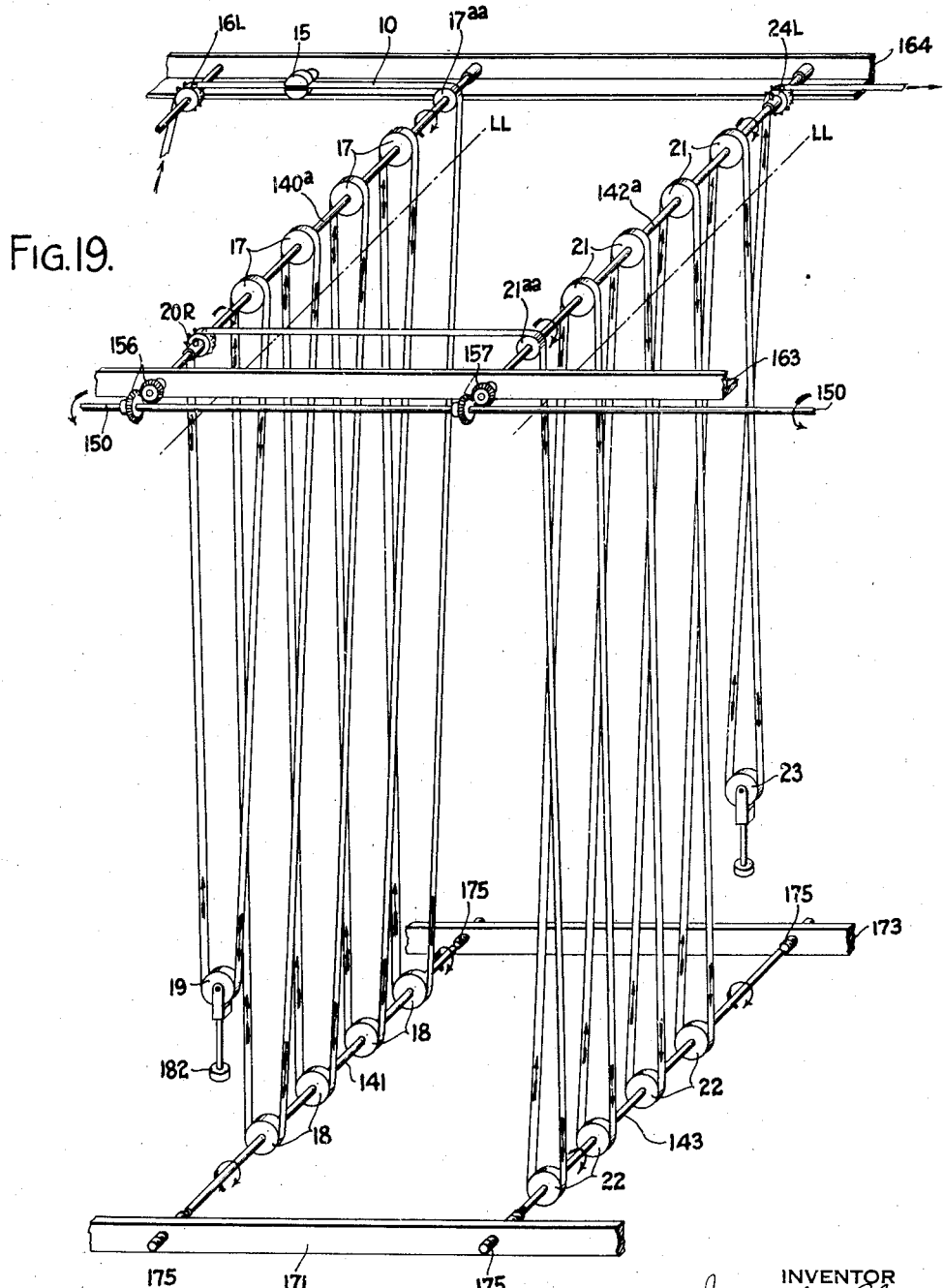

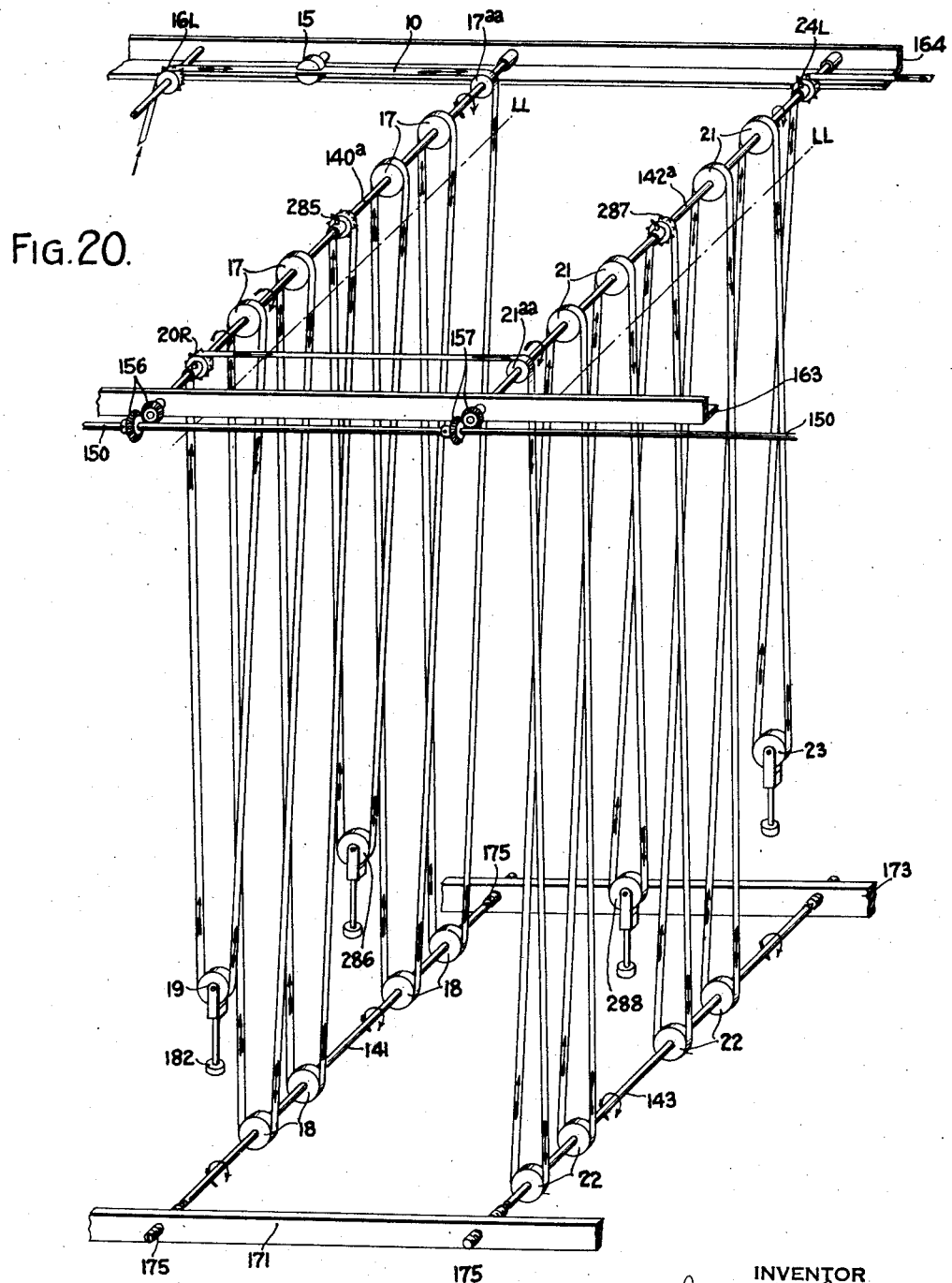

Patented Dec. 17, 1940

2,224,947

UNITED STATES PATENT OFFICE 2,224,947

FILM PROCESSING APPARATUS

Jesse M. Blaney, Stamford, Conn., assignor to Cinaudagraph Corporation, Stamford, Conn., a corporation of Delaware Application February 21, 1938, Serial No. 191,603

16 Claims. (Cl. 271—2.3)

This invention relates to film processing apparatus.

The object of the invention is to provide a machine which will pass a continuous length of film at a relatively high rate of speed through one or more processing steps such as developing, rinsing, fixing, washing, toning, dyeing, reversing, or drying the film.

A further object of the invention is to provide such a machine which will be simple and inexpensive to make and use, will be durable and will readily and automatically handle film of any base, age or condition without injury to the film.

Other features and advantages of this machine will become apparent as the description thereof proceeds.

In the drawings, Fig. 1 is a schematic diagram of a film processing machine constructed in accordance with the invention;

Fig. 2 is a schematic diagram, in perspective, of a portion of such machine, only such number of loops of film being shown as are necessary to illustrate the path of the film therein;

Fig. 3 is a sectional elevation of the input end of such machine;

Fig. 4 is a plan view of the input end of such machine;

Fig. 4A is a plan view of a portion of a film with which the film processing machine illustrated is particularly adapted for use;

Fig. 5 is a transverse vertical section of such machine along the line 5—5 of Fig. 4;

Fig. 6 is a horizontal sectional view of such machine along the line 6—6 of Fig. 5;

Fig. 7 is a vertical elevation of a portion of the machine, as indicated by the line 7—7 in Fig. 4;

Fig. 8 is a detail view, illustrating also an alternate construction;

Fig. 9 is a sectional view through a film roller of an alternate construction;

Fig. 10 is a sectional view through a film roller of another alternate construction, which is the prefered construction;

Fig. 11 is an elevation of a sprocket of preferred construction;

Fig. 12 is a sectional view through the sprocket of Fig. 11;

Fig. 13 is an enlarged plan view of a sprocket tooth and of the surrounding portion of the film;

Fig. 14 is a sectional view along the line 14—14 in Fig. 13;

Fig. 15 is an enlarged sectional view along the circumference of the sprocket of Fig. 11, taken along the line 15—15 in Fig. 14, and illustrating the operation of a sprocket when the film is at the point of maximum expansion;

Fig. 16 is a view similar to Fig. 15, illustrating the operation of a sprocket with film which is substantially less than fully expanded;

Fig. 17 is a sectional view illustrating an alternate construction for the sprocket;

Fig. 18 is a schematic diagram, similar to Fig. 2, illustrating a modification thereof;

Fig. 19 is a schematic diagram, similar to Fig. 2, illustrating another modification thereof; and Fig. 20 is a schematic diagram, similar to Fig. 2, illustrating still another modification thereof.

Referring to the schematic diagram, Fig. 1, the film 10, such as the ordinary motion picture film, and which is usually provided with sprocket holes along one or both edges of the film, is fed into the film processing machine over the sprocket 11R. This sprocket is at the right hand side of the machine, as the machine illustrated is viewed in the direction in which the film progresses through it. The suffix "R" appended to a designation means that the element so designated is positioned at the right hand side of such machine, while the suffix "L" means that it is positioned at the left hand side of such machine.

The film next passes over roller 12, down around roller 13, up and over a second roller 12, down around a second roller 13, and so on in spiral fashion to form a number of substantially vertical loops of film from the right hand to the left hand side of the machine. At the end of the last loop of film, the film passes up over a guide roller 14L, through the film cleaner 15 (see Fig. 7), and over the sprocket 16L.

Rollers 13 are co-axially mounted upon a horizontal shaft 138 which floats upon vertical rods 139 (see Fig. 3) so that the shaft 138 has a range of vertical motion. This construction is commonly called an "elevator" and for convenience the general reference numeral 130, in Figs. 1 and 3, is used as the designation thereof. The primary function of the elevator is to maintain a reservoir of film at the input of the machine, from which film is supplied to the machine while a new reel of film is being spliced on to the tail end of the film already in the machine. This function is achieved in cooperation with a film clutch including the sprocket 11R. Another part of the film clutch (not shown) is a mechanism which locks the sprocket 11R against rotation when the tail end of the film 10 leaves the supply reel. Film for the continued operation of the machine is then supplied by the elevator 130, during which time the floating rollers 13 rise. After the splice is completed, sprocket 11R is unlocked, so that film is drawn from the new reel, the floating rollers 13 return (by their weight) to their initial position and the reservoir of film is replenished.

The film next passes through the wet processing portion of the machine, that is, a developing tank 131, through a small rinsing tank 132, through a fixing tank 133, and through two washing tanks 134 and 135.

LL is the level of the liquids in the several tanks 131, 132, 133, 134 and 135. After the film leaves the wet processing portion of the machine it passes through a drier 136. If desired, there may be an elevator 137 at the output end of the drier. The completely processed and dried film is delivered over guide roller 113L to a take-up sprocket (not shown) from which the film passes to the reeling or other apparatus (also not shown). The reeling apparatus may be provided with a mechanism that operates when the take-up reel is full to stop the take-up sprocket and prevent its further rotation, so that the film may be cut and reels changed. Film completed by the processing machine during the reel changing time is thus temporarily stored in the elevator 137. This storing operation is attended by the dropping of the floating rollers 112 of the elevator. The reeling apparatus is provided with a two-speed drive for the take-up sprocket, so that when the empty reel is fitted, the take-up sprocket is driven at double speed (or other speed greater than normal) until the excess film has been removed from elevator 137, after which the take-up sprocket is driven at normal speed.

Now considering the detailed path of the film in the developing tank 131, and referring to the schematic diagram, Fig. 2 to supplement that of Fig. 1, (with occasional reference to Figs. 3–6) the film passes from the sprocket 16L down against a roller 17 at the top of the tank 131, down and under a roller 18 near the bottom of the tank 131, up and over a second roller 17 at the top of the tank, down and under a second roller 18 near the bottom of the tank, and so on between rollers 17 and 18 in spiral fashion to form a series of substantially vertical loops of film of fixed dimensions from the left hand to the right hand side of the machine. At the end of the last loop of film between rollers 17 and 18, the film passes around the next to last roller 17, down and under a weighted floating roller 19 and up and against the last roller 17, to form a supplementary loop of film, and then up and over a sprocket 20R.

From sprocket 20R, the film passes down and against a roller 21 at the top of the tank 131, down and under a roller 22 near the bottom of the tank, up and over a second roller 21 at the top of the tank, down and under a second roller 22 near the bottom of the tank, and so on around successive rollers 21 above and 22 below to form a series of substantially vertical loops of film of fixed dimensions from one side of the machine to the other. These loops of film are similar to those between rollers 17 and 18 except that the progression of the loops is from right to left instead of from left to right. At the end of the last loop of film between rollers 21 and 22, the film passes around the next to last roller 21, down and under a weighted floating roller 23 and up and against the last roller 21 to form a supplementary loop of film, and then up and over a sprocket 24L.

From the sprocket 24L the film passes down and against a roller 25 at the top of the tank 131, down and under a roller 26 near the bottom of the tank, up and over a second roller 25 at the top of the tank, down and under a second roller 26 near the bottom of the tank, and so on around successive rollers 25 and 26 in spiral fashion to form a series of substantially vertical loops of film of fixed dimensions from the left hand to the right hand side of the machine. These loops of film are similar to those between rollers 17 and 18. At the end of the last loop of film between rollers 25 and 26, the film passes around the next to last roller 25, down and under a weighted floating roller 27 and up and against the last roller 25 to form a supplementary loop of film, and then up and out of the developing tank 131.

The film could then, if desired, pass directly over a sprocket at the right hand side of the machine. It is preferred, however, with the machine illustrated, to have the film coming up and out of developing tank 131, pass over an idling guide roller 28R, positioned above a small rinsing tank 132, then down into the tank 132, under a roller 29 near the bottom of the tank, and then up and out of the rinsing tank and over a sprocket 30R. As rollers 28R and 29 are each rotatably mounted on fixed axes (as will appear later), sprocket 30R functions, with respect to the loops of film between rollers 25, 26 and 27 in the same manner as does sprocket 20R with respect to the loops of film between rollers 17, 18 and 19 and as does sprocket 24L with respect to the loops of film between rollers 21, 22 and 23. As a consequence, in the ensuing description of the drive for the film in the developing tank portion of the machine, such description for simplicity disregards the rinsing tank 132 and the rollers 28R and 29 and assumes that the film coming up and out of the developing tank 131 passes directly over sprocket 30R.

Rollers 17 are coaxially mounted on a single shaft 140 in such manner that each roller 17 is free to rotate relative to all the other rollers 17. This is obtained, in the machine illustrated in Figs. 2–6, by having each roller 17 rotatable relative to shaft 140. Shaft 140, of uniform diameter throughout its length, extends across the machine and is rotatably mounted at its ends upon fixed supports 170, 172 near the top of tank 131.

Rollers 18 are coaxially mounted on a single shaft 141 in such manner that each roller 18 is free to rotate relative to all the other rollers 18. This is obtained, in the machine illustrated in Figs. 2–6, in the same manner as with rollers 17, that is, by having each roller 18 rotatable relative to shaft 141. Shaft 141 is similar to shaft 140 and is similarly rotatably mounted upon fixed supports 171, 173, but near the bottom of tank 131.

Floating roller 19, weighted by the weight 182, is rotatably mounted in yoke 180 and is free to move up and down with the weight within wide limits.

Rollers 21, 22, 25 and 26 are mounted upon shafts 142, 143, 144 and 145, respectively, in the same manner that rollers 17 are mounted upon shaft 140, and shafts 142, 143, 144 and 145 are each similar to and similarly mounted as shaft 140. Floating rollers 23 and 27 are each weighted similarly as roller 19, and each is free to move up and down in a similar fashion.

The sprockets 16L, 20R, 24L and 30R are identical in size, number of teeth and tooth dimensions, and are driven together at the same speed. This drive is preferably effected from a single driving means such as a motor (not shown) which is coupled to a drive shaft 150 extending along the upper right hand side of the machine illustrated. The shafts 151, 152, 153 and 154 for these sprockets, respectively, are coupled to the shaft 150 by suitable non-slipping coupling means, such as the bevelled gearing 155, 156, 157 and 158, one for each shaft. Alternate shafts cross the machine, that is, shafts 151 and 153 extend across the machine while shafts 152 and 154 do not.

It is observed that although sprockets 16L, 20R, 24L and 30R are power driven, the film in tank 131 is not directly driven by these sprockets. The direct prime mover of the film in tank 131 is, in the construction illustrated, the weight associated with each of the floating rollers 19, 23 and 27. These weights serve to tow or draw the film through the tank.

In other words, the tension on the film which causes it to move through the tank 131 is produced by the weight of the floating rollers 19, 23 and 27 and of the weights and parts suspended therefrom. The sprockets do not produce any tension which causes motion of the film directly, or independently of the weighted floating rollers. The action of the sprockets is to confine the film tension produced by each weighted floating roller to the supplementary loop of which such roller is a part and to the series of loops immediately preceding such supplementary loop, to transfer energy to the weight associated with the floating rollers to replace the energy expended by such weights in towing the film through the tank and to transfer the film at the end of each supplementary loop, after it has been towed through the immediately preceding series of loops and transferred to such supplementary loop by the weighted floating rollers, over to the beginning of the next succeeding series of loops.

That this may be clear, the action of the sprockets and of the weighted floating rollers associated with tank 131 are now considered, having particular reference to Fig. 2.

The weight 182 associated with floating roller 19, together with the weight of the roller itself, of the yoke 180 and of connecting rod 181, produce tension in the film throughout the first series of loops and the supplementary loop in tank 131, i. e., the loops commencing at sprocket 16L and ending at 20R. This tension is confined to these loops by the sprockets 16L and 20R and is not transmitted to the film in the second series of loops and in the second supplementary loop, i. e., the loops commencing at sprocket 20R and ending at sprocket 24L. The tension in this second series of loops and supplementary loop is produced by the weight, and the weight of the other parts, associated with the floating roller 23 at the end of that series, which roller functions similarly as the roller 19 at the end of the first series. The tension produced by roller 23 is confined by sprockets 20R and 24L to the loops therebetween, which sprockets have functions relative to the second series of loops and supplementary loops which correspond respectively to the functions of sprockets 16L and 20R for the first series of loops and supplemental loop.

To illustrate the action of the weighted floating roller 19 in towing the film, assume that the film throughout the series of loops between sprockets 16L and 20R, and immediately preceding sprocket 16L, has a uniform pitch of the sprocket holes, which pitch does not change with processing of the film, and that, with sprocket 20R stationary, sprocket 16L is rotated clockwise a part of a revolution to transfer a short length of additional film past the sprocket. Obviously, sprocket 16L is unable to push this additional film, nor the film ahead of it, through the first series of loops. However, the film in this series of loops does proceed to move, but this motion is due entirely to the lowering of the weighted floating roller 19, which action pulls a certain length of film from the series of loops into the supplementary loop to take up the additional film and restore the film tension to its initial value. As the weight associated with the roller falls, it loses an amount of its potential energy proportionate to the distance which it falls.

Assume now that with sprocket 16L held stationary, sprocket 20R is rotated clockwise the same amount that sprocket 16L was previously rotated. This rotation of sprocket 20R withdraws from the supplementary loop at the end of the first series of loops and transfers to the beginning of the second series of loops a length of film equal to that added to the first series. In addition, as this film is withdrawn from such supplementary loop, the weighted floating roller 19 rises until at the end of this given rotation of sprocket 20R the roller 19 is at its initial position, i. e., its position before either sprockets 16L or 20R was rotated. Raising roller 19 raises the weight thereof so that the potential energy of such weight is restored to its initial value. In other words, the sprocket 20R, in transferring the film from the supplementary loop at the end of the first series of loops over to the beginning of the second series of loops, also replaces the energy used by the weighted floating roller 19 in towing the film through the first series of loops.

In practical operation sprockets 16L and 20R do not rotate intermittently as has been assumed for the purpose of the foregoing analysis, but operate continuously. This continuous operation of the sprockets merely results in each sprocket continuously performing the same functions that have just been ascribed to it on an asumption of an intermittent operation of the sprockets.

Inasmuch as the movement of the film in the second and third series of loops is similar to that just described for the first series, it is believed unnecessary to further discuss the second and third series of loops.

As a result of the above described construction for the developing stage of this film processing machine, the film therein is never subjected to a tension appreciably greater than half the weight associated with any floating roller. This is true whether the sprocket hole pitch of the film is different for successive runs of film passing into this processing tank of the machine, and whether the sprocket hole pitch changes while the film is processed in this tank of the machine, since the motion producing tension of the film is not produced by any sprocket engaging the sprocket holes of the film, but by a weighted roller suspended in the bight of the supplementary loop of film.

A further result of the above construction is that the machine automatically accommodates itself to successive runs of film having differing sprocket hole pitches and to changes in the sprocket hole pitch of a film occurring while the film is being processed in this tank of the machine, in each case the accommodation being made quickly, effectively and without impairing the film or the operation of the machine.

In explanation, it is to be noted first that the number of the sprocket holes of film in each series of loops remains constant notwithstanding any variations in the sprocket hole pitch of the film that may exist in the incoming film, or that may occur while the film is passing through the series of loops. This is due to the fact that the sprockets at the beginning and at the end of each series of loops (for example, sprockets 16L and 20R) are identical in size and in number of teeth and are identically coupled in non-slipping manner to the drive shaft 150, so that these sprockets rotate simultaneously at the same speed, and thus introduce one sprocket hole of film over sprocket 16L for each sprocket hole of film withdrawn over sprocket 20R.

It is also to be noted that in each set of loop forming rollers mounted on a common axis, the rollers are rotatable independently of each other so that, when the lineal speed of the film differs in different portions of a given series of loops, the rollers are free to rotate at such differing speeds that the peripheral speed of each roller may exactly equal the lineal speed of the portion of the film in direct engagement therewith.

To illustrate the operation of the machine when accommodating successive runs of film of differing sprocket hole pitch, assume that a non-expanding, non-contracting run of film having a normal sprocket hole pitch is originally in the machine and extends from sprocket 16L throughout the series of loops to sprocket 20R. Merely by way of example, assume further that there is 150 feet of such film in the series of loops between sprocket 16L and 20R and that the normal sprocket hole pitch is 0.300 inch, (i. e., 0.300 inch between corresponding points of linearly adjacent sprocket holes), so that there are 40 sprocket holes per foot of such film, or 6000 sprocket holes of film between sprockets 16L and 20R. Assume also that the position of weighted roller 19 under these conditions is midway between its upper and lower limits of motion.

Assume now that the above run of film is immediately followed by a run of non expanding, non-contracting film having a sprocket hole pitch substantially greater than normal—for example 0.302 inch—and that, with the junction between these two runs of film initially positioned at sprocket 16L, the shaft 150 is rotated. Thus, for every sprocket hole of the second run of film which is passed over sprocket 16L, more film, in lineal length, is passed into the series of loops than is withdrawn therefrom by sprocket 20R. The length of film between sprockets 16L and 20R thus constantly increases in small increments. These increments tend to reduce the tension in the film at the beginning of the series of loops. This reduced tension is rapidly transmitted through the film to the weighted floating roller 19, which thereupon drops in vertical position so as to take up the increments by increasing the vertical height of the supplementary loop of film and to restore the initial film tension. The incremental increases in film length being continuous while the junction between the first and second runs of film is traversing the series of loops between sprockets 16L and 20R, the dropping of the weighted floating roller 19 is continuous—although of course gradual—ceasing when the junction has passed sprocket 20R. At this time roller 19 has dropped one-half the total increase in lineal length of film between sprockets 16L and 20R. With the proportions assumed, this total increase will be one foot (i. e. $\frac{6000 \times 0.302}{12} - 150 = 151 - 150 = 1$)

so that the new vertical position of roller 19 is 6 inches below its initial mid-position. Thereafter, so long as the film of the second run passes over sprocket 16L, the length of film in the series of loops remains at 151 feet and thus the vertical position of roller 19 remains at 6 inches below its initial mid-position.

It is to be observed that in achieving the above accommodation the film was never subjected to any abnormal tension or sudden movement, and that the operation of the machine was never interrupted or impaired.

In the event the second run of film had had a sprocket hole pitch substantially less instead of substantially greater than normal, it would have been automatically accommodated in the same fashion as that described, except that the accommodation would have been in the opposite sense, that is, as less film in lineal length would pass over sprocket 16L than would pass over sprocket 20R, the lineal length of the film in the series of loops would decrease. As a consequence, the tension of the film at the beginning of the series of loops would tend to increase, this increase being transmitted through the film to the weighted floating roller 19. The vertical position of such roller would rise so as to relieve the excess tension and to absorb the reduction in the lineal length of film in the series of loops by decreasing the vertical height of the supplementary loop of film. After the series of loops had been completely filled with film of the subnormal pitch, the weighted floating roller would remain at its raised position until a run of film having a different sprocket hole pitch would pass over sprocket 16L.

To illustrate the operation of the machine when accommodating film in which the sprocket hole pitch changes while the film is being processed in the machine (i. e. while the film is passing through the series of loops) assume first, as before, that the film originally in the machine is a non-expanding, non-contracting run of film having a normal sprocket hole pitch, that there is 150 feet of such film or 6000 sprocket holes between sprockets 16L and 20R and that the weighted floating roller 19 is in its mid-position. Assume further that this run of film is followed by a run of film which initially has a normal sprocket hole pitch but which expands with processing, and that, with the junction between these two runs of film at sprocket 16L, the shaft 150 is rotated.

While this junction is passing through the series of loops, the same amount of film, in sprocket holes and in lineal length, is being introduced to the series of loops over sprocket 16L as is being withdrawn therefrom over sprocket 20R. However, the portion of the second run of film that has passed over sprocket 16L is expanding with the processing thereof so that the amount of film, in lineal length, (i. e., in feet) in the series of loops is gradually increasing, although the amount of film, in sprocket holes, in the series of loops remains constant. This increase in the lineal length of the film tends to reduce the tension therein, and the reduction in film tension being promptly transmitted through the film from wherever it occurs to the weighted floating roller 19, such roller drops in vertical position to restore the initial tension and absorb the increased film length. Roller 19 thus gradually drops as the junction between the two runs of film passes through the series of loops.

The instant the junction passes over sprocket 20R—in other words the instant the series of loops is completely filled with the expanding film—the amount of film, in lineal length, in the loops between sprockets 16L and 20R no longer increases, but instead becomes an unvarying amount in length, with the result that the roller 19 ceases to fall.

Assuming now that the operation of the machine is continued at the same rate and that more of this second run of film (i. e., the expanding film) is introduced into the series of loops over sprocket 16L. The result is that the same amount of film in sprocket holes is withdrawn from the series of loops as is introduced thereto, that the amount of film in lineal length in the series of loops remains constant, and that the roller 19 remains at a given vertical position (which is the position to which it has fallen as described above). However, the amount of film in lineal length withdrawn from the series of loops is greater than the amount of film in lineal length introduced thereto, as the outgoing film, having expanded while in the series of loops, has a larger sprocket hole pitch than the incoming film. In other words, there is an excess of lineal output over lineal input, the excess being due to the lineal expansion or stretch of the film, resulting in the lineal speed of the outgoing film being faster than that of the incoming film. These lineal film speeds do not change so long as there are no changes in the incoming film nor in the operation of the machine.

To illustrate this condition, if the stretch of the film between linearly adjacent sprocket holes is the substantial amount of 0.002 inch (i. e. if the sprocket hole pitch changes from 0.300 inch to 0.302 inch as it travels from sprocket 16L to sprocket 20R) and if 6000 sprocket holes of film are passed over each sprocket per minute, the lineal speed of the incoming film is 150 feet per minute $$\frac{(6000 \times 0.300)}{12}$$

while the lineal speed of the outgoing film is 151 ft. per minute $$\frac{(6000 \times 0.302)}{12}$$

This increase in the lineal speed of the film is achieved gradually as the film progresses through the series of loops. The lineal speed of the film thus differs in different portions of the series of loops; for example, the lineal speed of the film engaging a given loop-forming roller 17 is greater than that engaging the preceding roller 17. These rollers have the same diameter, but as these rollers are rotatable independently of each other, they may, and do, rotate at such different speeds that the peripheral speed of each roller 17 is the same as the lineal speed of the film in engagement therewith. There is thus no slippage of the film with respect to any roller 17, so that there is no friction loss nor reduction in film tension due to any such film slippage. The same condition exists between the film and the several lower loop-forming rollers 18. The weighted floating roller 19 is thus as effective in pulling the film through the series of loops when the film expands with processing as when the film does not change its length with processing.

It is to be observed that the machine has thus automatically accommodated itself to the run of expanding film without interrupting or impairing the operation of the machine and without subjecting the film to any abnormal tension or sudden movement.

Had the second run of film contracted, instead of expanded, with processing, it would have been automatically accommodated in the same fashion as that described except that the accommodation would have been in the opposite sense. Thus the weighted floating roller 19 would have risen as the junction between the runs of film was passing through the series of loops, and then would have remained in its raised position after the junction passed beyond such loops. The output of the film in lineal length would then be less than the input in lineal length, although, as before, the input and the output of the film in sprocket holes would remain the same. Also, as before, the rollers 17 and 18 would each rotate without slippage between the film and the rollers, notwithstanding the fact that the lineal speed of the film would decrease as the film passed through the series of loops. The weighted floating roller 19 would thus remain as effective in pulling the film through the series of loops as it was when the film was non-contracting, or even expanding, in character.

For simplicity, the foregoing description of the operation of the developing stage of the machine in accommodating itself to successive runs of film having sprocket hole pitches which initially deviate in varying amounts from the standard pitch and to changes in the sprocket hole pitch of the film occurring while the film is being processed in the machine, has been made upon the assumption that successive runs of film differ in only one or the other of these two variables. It is clear, however, that the machine is capable of accommodating itself to successive runs of film differing in both of these variables, and also, through a substantial range of variation of each variable. As these variables arise due to differences in the manufacture, base, age, previous treatment, and present condition of different runs of film, the film processing machine of this invention readily and automatically handles film regardless of its manufacture, base, age, previous treatment and present condition, and all without injury to the film.

Figs. 3–6 inclusive in more detail than in Figs. 1 and 2 one construction for the developing stage of the machine.

The support for all the parts of the machine, except the tanks, is a framework 160 supported above the tanks of the machine by a plurality of posts 161, 162 at either side thereof. This framework consists of longitudinally extending angle bars 163 and 164 at either side of the machine which are connected at intervals by the crosspieces 165. If desired, provision may be made for raising the framework so as to withdraw the film loops from the tanks and thereby facilitate threading of the film or repair of a film rupture.

Secured to the angle bar 163 and extending downwardly therefrom into tank 131 are three pairs of vertical rods 167. Three pairs of vertical rods 168 extending down into tank 131 are similarly secured to the angle bar 164, the position of the vertical rods 168 relative to the vertical rods 167 being such that the vertical plane including each two corresponding rods at opposite sides of the machine is perpendicular to the longitudinal axis of the machine. Upon rods 167 at one side of the machine are adjustably mounted two arms 170 and 171, one being positioned near the top and the other near the bottom of the tank 131. Similar arms 172 and 173 are adjustably mounted upon rods 168 at the other side of the machine near the top and bottom, respectively, of the tank. Suitable set screws (not shown) may be provided for securing the arms 170, 171, 172 and 173 to the rods 167, 168.

The arms 170 and 172 at opposite sides of the machine near the top of the tank 131 are secured in fixed spaced relation by three pairs of tie rods 174. Similar arms 171 and 173 at opposite sides of the machine near the bottom of the tank 131 are secured in the same spaced relation by three other pairs of tie rods 174.

The set of rollers 17 near the top of tank 131 is mounted upon the shaft 140 which extends across the machine. This shaft 140, of uniform diameter, is rotatably supported on arms 170 and 172 by means of an adjustable bearing screw 175 at each end of the shaft, the bearing screws being positioned between the rods of corresponding pairs of vertical rods 167 and 168. The bearings for shaft 140, one of which is illustrated in Fig. 8, are preferably conically shaped recesses at the ends of the shaft accommodating cone-shaped ends of the bearing screws 175, the bottoms of the recesses being cylindrical so as to provide clearance for the tips of the bearing screws. Shaft 140 and bearing screws 175 are preferably made of metal resistant to the developing solution contained in tank 131. The metals which have been found most satisfactory are 18—8 (type 303) stainless steel, and Inconel.

The other two sets of rollers (21 and 25) near the top of tank 131 are mounted respectively upon shafts 142 and 144, each of which is of uniform diameter and rotatably supported upon the arms 170 and 172 by adjustable bearing screws 175, similarly as with shaft 140. The sets of rollers 18, 22 and 26 near the bottom of tank 131 are mounted respectively on shafts 141, 143 and 145 which extend across the machine. Each of these shafts is of uniform diameter and is rotatably supported on arms 171 and 173 by adjustable bearing screws 175, similarly as with shaft 140.

As a result of this construction, the arms 170 and 171, 172 and 173 may readily be raised or lowered along the vertical rods 167 and 168, as desired, and then clamped in the desired position along such rods. This vertical adjustment of these arms provides an adjustment of the vertical distance between the upper set of rollers 17, 21 and 25 and the lower set of rollers 18, 22 and 26, and also provides an adjustment of these rollers relative to the top and bottom of the tank 131. Also, as a result of the above construction, the axes of shafts 140 and 141 are always parallel to each other and to the axes of each of the other shafts 142, 143, 144 and 145, and each of these shafts is always perpendicular to the longitudinal axis of the machine, regardless of the position of the arms relative to the tank and to each other.

In the construction illustrated all the rollers in each of the sets 17 and 18 are identical in construction and size and each is rotatable upon the shaft supporting the same. The rollers are preferably of hard rubber as hard rubber is neutral with respect to the solutions in which the rollers run, as it does not disintegrate by reason of being continually wet and as its coefficient of friction is low. In explanation of the latter, hard rubber repels water (i. e. does not break its surface tension) so that the solution in the tank exerts a minimum drag upon the hard rubber rollers. If desired, however, the rollers may be made of a phenol condensation product which is neutral with respect to the solution in which they run.

The individual rollers 17 and 18 are spaced by means of small washers 178 (see Figs. 6 and 8). Axial movement of the rollers is prevented by the spring washers 179 (see Figs. 5 and 6) which may be sprung into position in suitable grooves in the shafts at each end of each set of rollers. If desired, the spring washers may be omitted and the end rollers (such as 17° in Fig. 8) provided with a stop screw 190 the lower end of which projects into a groove 191, formed in the shaft, without securing the end rollers 17° to the shaft. In this position the upper end of the screw 190 is position below the film engaging surfaces of the roller, as illustrated.

To prevent the film from jumping from one roller to another, particularly when threading the machine or repairing film ruptures, the film retaining rollers 195 are provided. These rollers, preferably made of hard rubber, are mounted on the tie rods 174, and while small in diameter, are sufficiently large to extend between the flanged edges of the film rollers 17, 18. The rollers 195 preferably have straight sides, and a small clearance with the flanged edges of the rollers 17, 18; and while the rollers 195 are rotatably mounted upon the tie rods 174 so that rollers 195 are free to drift with rollers 17, 18, the rollers 195 normally do not rotate. Two film retaining rollers 195 are preferably provided for each film roller 18, as illustrated in Fig. 6, while only one film retaining roller 195 is provided for each film roller 17, as illustrated in Fig. 4. These rollers 195 are positioned on the down side of all the film rollers 17 except the film roller 17 immediately preceding output sprocket 28R, where the roller 195 is positioned on the up side.

The floating roller 19, similar in construction to rollers 17, 18, is rotatably mounted upon an inverted U-frame 180 (Figs. 3, 5) to which a weight 181 is connected by the rod 182. This rod is of substantial length and passes through a guide hole in a guide 183 which is adjustably secured to the adjacent pair of vertical rods 167. Floating roller 19 thus has a substantial range of vertical motion, the upper limit of which is when the weight 182 engages guide 183 and the lower limit of which is when the U-frame 180 engages guide 183. In rotatably mounting roller 19 upon U-frame 180, the roller is preferably secured to a shaft 197, as by a set screw, and the ends of shaft 197 cone-shaped and mounted in conical recesses in the sides of U-frame 180. A film retaining roller 198 is provided for floating roller 19, this roller 198 being mounted upon a rod 199 extending between the sides of the U-frame beneath the roller 19.

The construction for the second and third series of film loops in the developing tank 131 being similar to that just described for the first series of film loops, detailed description thereof is omitted.

As previously described, the film 18, after completing its travel through the three series of film loops in the developing tank 131, passes up out of the tank and over guiding roller 28R (see Figs. 1 and 4) positioned above a small rinsing tank 132, then passes under a roller 29 positioned within and near the bottom of tank 132, and then passes up and out of the tank 132 and over sprocket 30R. Roller 28R is rotatably mounted upon the shaft 165 which supports and drives the sprocket 30R. Roller 29 is rotatably mounted upon a short rod (not shown) which is suitably secured to the two vertical rods 167 provided for this tank.

To complete the description of the wet processing portion of the machine, (and referring to Fig. 1) the film from sprocket 30R passes through three series of loops in the fixing tank 133, and through three series of loops in each of the two washing tanks 134 and 135. As each of these series of loops is similar to the first series of loops in the developing tank 131 (with the exception of the first series of loops in tank 133, where there is one less loop in view of the transverse displacement of sprocket 30R at the beginning thereof), and as each of these several loops has a supplementary loop at the end thereof, particular description thereof is unnecessary. It is believed sufficient to identify the remaining sprockets of the wet processing portion of the machine which are shown in Fig. 1 as follows, 34L, 38R, 42L, 46R, 50L, 54R, 58L, 62R and 66L; to identify the remaining top sets of rollers, commencing with the first set in fixing tank 133, as follows, 31, 35, 39, 43, 47, 51, 55, 59 and 63; to identify the remaining bottom sets of rollers, commencing with the first set in fixing tank 133, as follows, 32, 36, 40, 44, 48, 52, 56, 60 and 64; and to identify the remaining floating rollers, commencing with the first floating roller in fixing tank 133, as follows, 33, 37, 41, 45, 49, 53, 57, 61 and 65.

As previously mentioned, the film at the input of the wet processing portion of the machine passes through a cleaner 15. This cleaner, shown in Fig. 7, consists of two suction tubes 200 positioned transversely of the film with one above and the other below the film and with each tube being provided with a series of apertures 201 adjacent the film. The apertured portions of tubes 200 are contained within a cylindrical housing formed by the two arcuate members or caps 202. These members are suitably secured together with their abutting ends slightly separated so as to provide apertures for the entry and exit of the film. At both the entering and exit apertures for the film, the film is engaged upon both its surfaces by wipers of a suitable cloth such as mohair or plush 203. These wipers are conveniently provided in two strips, each extending from outside the member 201, through the entering aperture, between one or the other of the tubes 200 and the corresponding member 202 and out through the exit aperture. The ends of the wipers are secured in any suitable manner to the members 202. The function of cleaner 15 is to remove all foreign matter accumulated in printing and subsequent handling of the film prior to its introduction into the developing tank 131.

At suitable positions in the film path, such as between tanks 131 and 132, between tanks 132 and 133, between tanks 133 and 134 and after tank 135, it is preferred to provide air jets or the like to prevent the solution entrained in the film from being carried over to the next tank. These air jets, not shown, are positioned on opposite sides of the film and are arranged to direct the air therefrom against the film in the direction opposite to its direction of travel.

As is well known, raw film expands during wet processing. The lineal expansion of such film is indicated in Fig. 1 by the relative positions of the floating rollers 19, 23, etc. Had the film not expanded, all these rollers would be in substantially the same horizontal plane, (assuming the film in the wet portion of the machine to be uniform in all other respects), and the extent of their departure therefrom is a rough indication of the relative amount of lineal expansion of the film in the different stages of the wet processing portion of the machine.

The drier 136 may be of any suitable construction. It is preferred, however to utilize a construction similar to that described for the wet processing portion of the machine, inasmuch as film contraction is substantially as much a problem when drying the film as film expansion is when wet processing the film. In view of the detailed description of the wet processing portion of the machine it is believed sufficient to identify the sprockets of the drier which are shown in Fig. 1, as follows: 70R, 74L, 78R, 82L, 86R, 90L, 94R, 98L, 102R, 106L and 110R.

It is desirable to provide the film rollers in the drier with ball bearings so as to reduce to a minimum the friction between each film roller and the shaft on which it is rotatably supported. Ball bearings are thus usable in the drier although not so usable in the wet processing portion of the machine as ball bearings are made of metals which may be, and usually are, hardened but which corrode under the action of the liquids in the wet processing tanks. In the drier therefore the film in the film rollers not only moves more freely than in the wet processing portion of the machine, in view of the absence of the dragging action of liquids upon both the film and film rollers, but the film rollers have less friction (both dynamic and static) upon their shafts, due to the use of the roller bearings. As a consequence less weight may be used with the floating rollers in the drier than in the wet processing portion of the machine. By this resulting arrangement the film in the drier is never subjected to an excessive tension. This is true not only when the film is in motion in the drier, but also when the film is stationary in the drier. When the film is in motion in the drier, the accommodation of the drier to changes in the sprocket hole pitch of a film occurring while the film is traveling through the series of loops thereof (in this instance, accommodation to changes due to contraction or shrinkage of the film), and the accommodation of the drier to successive runs of film having sprocket hole pitches which initially deviate in varying amounts from the standard pitch, are effected in the same manner as that described for the developing tank of the wet processing portion of the machine. The case when the film is stationary in the drier occurs when there has been a film rupture, necessitating stopping the machine for a short time to repair the rupture. In this instance, although the film be stationary, the drying of the film continues, and as the film dries, it continues to contract. In contracting, additional tension is introduced into the film which, unless relieved, may itself cause rupture of the film. In the arrangement as described this additional tension is relieved by being transmitted through the film to the floating roller to cause its upward displacement and a resulting readjusting movement of the film and film rollers. Such a readjustment is facilitated by the reduction of the static friction resulting from the use of the ball bearings for the film rollers.

The lineal contraction of raw film during drying is indicated in Fig. 1 by the relative positions of the floating rollers 69, 73, 77, etc. Had the film not contracted, all these rollers would be in substantially the same horizontal plane (assuming the film in the drier to be uniform in all other respects), and the extent of their departure therefrom is a rough indication of the relative amount of shrinkage of the film in the different sections of the drier.

The first section of the drier preferably includes one or more polishing drums 205 for polishing the inside or non-emulsion side of the film. These drums are conveniently located in each series of loops intermediate the top set of film rollers 67, 71 and 75 and the bottom set of film rollers 68, 72 and 76.

Returning to the wet processing portion of the machine illustrated in Fig. 1, the developing tank 131 and the fixing tank 133 are each provided with the usual equipment (not shown) for circulating and replenishing the solutions therein.

The wash system of the machine illustrated in Fig. 1, consisting of the rinsing tank 132 and the washing tanks 134 and 135, together with the equipment for circulating and feeding the liquids therein, is somewhat unusual. Fresh water is run into the bottom of the second washing tank (tank 135) through the pipe 210, the flow or quantity of fresh water so introduced being normal for an ordinary washing tank.

The first and second washing tanks (134, 135) are coupled at their tops by one or more large pipes 211 so that the water from the second washing tank 135 overflows into the first washing tank 134. The first washing tank 134 and the rinsing tank 132 are coupled at their bottoms by one or more large pipes 212. The water in rinsing tank 132 overflows out of the tank through pipe 213. The water in the wash system thus flows from the fresh water supply to and then through the second washing tank 135, then to and through the first washing tank 134 and then to and through the rinsing tank 132, after which the water is discarded. The direction of water flow in this wash system is thus opposite to the direction of film flow between these tanks of the wash system, the film traveling, as to these tanks, first into rinsing tank 132, then into the first washing tank 133 and finally into the second washing tank 134.

Since the rinsing tank 132 is substantially smaller than either of the washing tanks 134, 135, the velocity of the water in the rinsing tank 132 is great. Furthermore, the water in the rinsing tank 132 having come from the washing tanks 134, 135, the water in rinsing tank 132 is acid and contains an appreciable amount of thiosulfate. As a consequence the action of the water in rinsing tank 132 is exceedingly effective in checking development both in respect of rapidity of osmosis and in speed of pH depression. This is particularly so when using the machine with 16 mm. film, as with the speed of film travel which is obtained with such film, the length of time the film is immersed in rinsing tank 132, while brief, is sufficient to check developement. Furthermore, the high velocity of the water and the low pH of the solution in rinsing tank 132 checks development effectively whether the wash water varies in temperature or not. Finally, this effective checking of the development is obtained without cost, since not only is the expense of fresh water for both the rinsing tank 132 and first washing tank 134 avoided, but the water that is used in these tanks is that from the second washing tank 135, which heretofore has been discarded.

The film processing machine of this invention is thus simple and inexpensive in construction, as it uses shafts each of which is of uniform diameter and film rollers which may be inexpensively made by the molding process, using one standard sized mold for all rollers. Further, the machine readily and automatically handles film of any age, base or condition, without injury to the film, by its accommodation to the changes in the sprocket hole pitch of the film occurring during film processing, whatever the character or magnitude of such changes and by its accommodation to initial deviations from the standard sprocket hole pitch which exist in different runs of film. Also, the machine is able to handle film at a substantially higher film speed than any known commercial film processing machine can handle the same film, so that, with the film processing machine of this invention, less time is required to process a given run of film and so that fewer machines, provided they are according to this invention, are required to process a given quantity of film in a given time.

Contributing materially to produce this higher film speed is the simplicity of the machine and the small frictional losses therein. The simplicity of the machine arises from the fact that the many vertical loops of film between successive sprockets are of fixed dimensions under all conditions of operation, so that, making these loops of equal length, the film rollers therefor are mounted on two parallel shafts. Only the single, supplementary loop of film is of varying dimensions, for which single loop provision is easily made. The small frictional losses in the machine arise by rotatably mounting the shafts which carry the film rollers and by independently and rotatably supporting the film rollers on these rotatable shafts. With this construction the friction between a set of rollers and the shaft on which such rollers are mounted causes the shaft to rotate so that there is no substantial motion between the shaft and the rollers mounted thereon. As a result the work expended in overcoming the friction between such rollers and the shaft is substantially less than when the shaft is non-rotatable. As the friction introduced by the bearings for the roller supporting shaft is small, the resultant friction loss of the arrangement is very materially less than when the shaft is non-rotatable. This arrangement enables a large number of film loops to be provided between sprockets and the film to be handled at a high speed, all without causing the film tension to exceed the tensile strength of the film.

Further with no substantial motion between the shaft and the rollers mounted thereon, and with low-friction supports for the shafts, the wear on the rollers and on the shaft is practically nil, so that the life of the machine is very materially longer, and the maintenance difficulties and expense very much less than with a machine having a non-rotatable roller-supporting shaft.

In this connection, it is to be observed that the speed at which film may be handled by a film processing machine is governed by the tensile strength of the film and the length of time the film is subjected to the one or more processing operations. Thus, in increasing the film speed for a given processing machine, consideration must be given not only to the increase in the film tension necessary to achieve the increased speed (assuming the film travel during the processing period to be unchanged) but also to lengthening the film travel so that the duration of the film processing period remains the same. Consideration must also be given to the fact that if the lengthening of the film travel is to be obtained by increasing the number of film loops between sprockets handled by a given machine, this method of lengthening film travel involves increasing the film tension still more.

It is also to be observed that the tensile strength of a film, and thus the factor which limits the film speed, is governed by the size of the film, the material of which it is made, and the size and number (or pitch) of the sprocket holes therein. Thus, as substandard film is generally made of a cellulose acetate base (for safety, and thus known as "safety film"), while the standard film is generally made of a cellulose nitrate base, and as the substandard film is narrower, generally has only one row of perforations, and as those perforations are narrower, the film speed obtainable with sub-standard film is substantially less than that obtainable with standard film.

While the principles of the film processing machine of this invention are generally applicable to the processing of any size film, the film processing machine illustrated is particularly adapted for handling sub-standard film, commonly known as the 16 mm. film, formed on an acetate base and having a single row of sprocket holes of relatively small width along one edge of the film, and a sound track along the unperforated edge of the film. A portion of such a film 10 is shown in Fig. 4A, the single row of sprocket holes or film perforations 235 being positioned along edge 230, the sound track 236 being positioned along edge 232, and the picture frames 237 being positioned between film perforations 235 and sound track 236. Such a film has been handled by the film processing machine of this invention at speeds from 120 up to 200 film ft. per minute. With a film processing machine according to this invention designed for use with standard, 35 mm. film, such film may be handled at substantially greater speeds.

The loop forming film rollers of the film processing machine of Figs. 1–8 may be of the conventional shape, as shown in detail in Fig. 8, where each roller has two flanges 219, 220 between which are two circumferential shoulders or lands 221, 222 engaged by the edges of the film, the surfaces 223 of the roller between shoulders 221, 222 being recessed so that it does not engage the film. It has been found, however, that in some cases such rollers are not entirely satisfactory, such as when handling at substantial speeds single perforated sub-standard 16 mm. film having a sound track thereon. It has been found that abrasion takes place at the edges of the film. Such abrasion is particularly harmful on the unperforated edge of the film along which the sound track is positioned. Such abrasion, occurring on the under or non-emulsion side of the film directly beneath the sound track, causes a ground noise to occur in the reproduced sound when the sound track is used to reproduce the sound registered thereon.

This abrasion, and the resulting ground noise, has been greatly diminished and substantially eliminated by employing the crowned film rollers 225 shown in Fig. 9. The roller 225, with the conventional flanges 226, 227, has its film engaging surface 228 crowned, preferably radially, so that the film 10, when flat and engaging the roller parallel to the axis of the roller, as shown in Fig. 9, engages the surface 228 at its crown and leaves a clearance 229 between surface 228 and one edge, 230, of the film, and leaves a similar clearance 231 between surface 228 and the other edge, 232, of the film.

In explanation, the film roller 225, does not produce the abrasions encountered with the conventional film roller, such as that shown in Fig. 8, apparently because sidewise motion of the film is eliminated, or at least substantially reduced. This sidewise motion or side slip apparently arises as a result of the helical or spiral path of movement of the film in traveling through the series of film loops. The film approaches the roller at an angle, with the result that one edge of the film is compelled to engage or lie near the base of one flange of the roller as the film engages the roller. The film leaves the roller at an opposite angle, with the result that the other edge of the film is compelled to engage or lie near the base of the other flange of the roller as the film disengages the roller. Thus as the film is travelling around the roller it must also move or slip sideways. When the radially crowned film roller 225 is employed, the crown appears to have a centering action on the film so that side slip is minimized. Further, the film is supported principally by the peak of the crown, so that, even when the film attempts to conform to the crown contour or surface 228, the pressure of the film against the surface 228 is very low at the edges of the film. Thus, even if there is some side slip, the pressure at the edges of the film is not enough to produce film abrasion.

In some cases it has been found advisable, in order to completely eliminate the abrasion and the resulting ground noise, to employ a thin, flat, soft rubber band or tire 234 between the crowned surface 228 of the roller and the film. Such a band is shown in Fig. 10 between the crowned surface 228A of film roller 225A and the film 10. The exterior surface of the band 234 is still crowned and thus functions similarly as the crowned surface 228 of Fig. 9. In addition, the band 234 enables the film to have a slight side sway without relative motion occurring between the film and the surface of the band or tire 234 in engagement with it. In other words, the side sway of the film is effected by the resiliency of the tire.

It is to be understood that while the crowned film rollers 225 and 225A were developed for use as the rollers 17, 18 and 19 etc. of the film processing machine of this invention, these crowned film rollers may be used advantageously in all types of film processing and film handling machines and with all types and sizes of film. These rollers, however, are particularly useful in the machines processing or handling sub-standard single perforated sound film.

The sprockets of the film processing machine of Figs. 1–8 may be of conventional construction. It is preferred, however, when the machine is handling single perforated film such as the sub-standard 16 mm. film, to employ sprockets of the construction shown in Figs. 11–16. Such sprockets reduce strain upon the film and minimize injury thereto, and are particularly effective at high film speeds.

The sprocket 240 of Figs. 11–16 consists of a hub member 241, a tooth disk 242, and a retaining member 243, each preferably made of metal, such as stainless steel, which is not corroded by the solutions used in the film processing tanks. Hub member 241 has an aperture 244 by which it is mounted upon a supporting shaft, and has suitable means, such as set screw 245, for securing the sprocket to its supporting shaft. The circumference of hub member 241 is formed with a flange 246 having two abutting radial surfaces 247, 248, the inner surface 247 being perpendicular to the axis of the sprocket and the outer surface 248 flaring outwardly at a small angle to the surface 247. At the base of inner surface 247 the hub member 241 has a circumferential surface 250 forming a film supporting land or shoulder. With single perforated sound film the sound track edge 232 of the film 10 (see Fig. 4A)

engages surface 250, so that such surface is referred to as the sound land. The circumferential surface 251 of the hub member which lies beneath the center or picture portion of the film has a smaller diameter than the sound land 250, so that the film does not engage surface 251. The hub member 241 has a land or shoulder 252 at the sprocket tooth side of surface 251. The land 252 is preferably of the same diameter as the sound land 250. Hub member 241 has a radial surface 253 from the sprocket tooth edge of land 252 to a hub 254.

Tooth disk 242 is an annular disk which is fitted over hub 254 and secured in position against surface 253 by the retaining member 243. Screws 255 pass from retaining member 243 through suitable apertures in disk 242 into the hub member 241 to hold the parts in assembled relation. The circumference of disk 242 is formed into the teeth 256 of the sprocket 240 for engaging the perforations or sprocket holes 235 in the film 10. Teeth 256 are so formed that the teeth extend radially outwardly substantially beyond the land 252 and radially inwardly so that the roots of the teeth 256 are a small distance below the land 252. In other words, the pitch circle 257 of the tooth disc 242 at the base of the teeth 256 has a slightly smaller diameter than that of land 252.

The retaining member 243 has a land 258 adjacent the sprocket tooth disk 242, the diameter of the land 258 being the same as that of land 252. Retaining member 243 is formed with a flange 259 having two abutting radial surfaces 260, 261, the inner surface 260 being perpendicular to the axis of the sprocket, with its base at land 258, and the outer surface 261 flaring outwardly at a small angle to surface 260.

The inner surfaces 260, 247 form straight sides for guiding the film at its edges, and are preferably as high as the tip of the sprocket teeth 256. The distance between these straight sides 260, 247, is preferably only a few thousandths of an inch more than the maximum width of film.

The sprocket disk 242 is substantially narrower than the width of the sprocket holes or film perforations 235, and the teeth 256 in disc 242 are substantially smaller than the lineal dimension of the sprocket holes 235. The effective circular pitch of the teeth 256 on disc 242 (which, in the sprocket illustrated, is the circular pitch measured along the land circle 252, as is hereafter explained) is preferably such that a number of sprocket teeth, substantially more than 2, are simultaneously in driving engagement with the sprocket holes of film of maximum expansion. This is illustrated in Fig. 15. The sprocket, rotating clockwise, has an effective circular pitch such that the front surfaces of the teeth 256a, 256b, 256c and 256d are simultaneously in engagement with the leading transverse edges of the corresponding sprocket holes 235a, 235b, 235c, and 235d of the film $10^{EXP}$, which is film of maximum expansion.

With this arrangement the sprocket teeth are in driving engagement at any one time with only one sprocket hole of contracted film. This is illustrated in Fig. 16, where tooth 256a is the only tooth in driving engagement with the contracted film $10^{CON}$. Thus, the front surface of tooth 256a is in engagement with the leading transverse edge of sprocket hole 235a, while the front surfaces of the other teeth 256b, 256c and 256d are not in engagement with the leading transverse edges of the corresponding sprocket holes 235b, 235c, 235d. As the sprocket rotates and the film $10^{CON}$ disengages from the sprocket, the leading transverse edge of the sprocket hole 235a moves outwardly along the front surface of tooth 256a, as indicated by the dotted lines in Fig. 16. The shape of this front surface of the tooth is the same for all teeth and is such that, as contracted film disengages the sprocket, the film moves backward relative to the sprocket. As a result of this tooth-to-tooth slip of the film the leading transverse edge of the succeeding sprocket hole 235b engages the front surface of the tooth 256b, and the driving engagement between the sprocket and the film is transferred from tooth 256a to the succeeding tooth 256b. Expanded film readily disengages from sprocket teeth of such a shape, as shown by the dotted lines in Fig. 15.

An important result of this arrangement, whereby the sprockets 240 are proportioned for film of maximum expansion, is in eliminating, or at least in very substantially reducing, injury to the film due to the tooth-to-tooth slip of the film over the sprockets. There is always some such slip whenever the sprocket hole pitch of the film is not equal to the circular pitch of the sprocket engaging such film. As the effective circular pitch of sprockets 240 is equal to the sprocket hole pitch of film of maximum expansion, as maximum expansion of the film occurs at the end of the wet processing stage (i. e., at the end of the washing tank 135) and as even at this point the expansion of the film actually attained frequently does not equal the allowable maximum, it is clear that tooth-to-tooth film slip is substantially always present in some degree at every film sprocket in the film processing machine. However, the arrangement disclosed results in having the maximum tooth-to-tooth film slip at the points of minimum film expansion, which is where the film is dry and thus is where the film is toughest, (that is, at the beginning of the wet processing stage and at the end of the drying stage), and in having the minimum tooth-to-tooth film slip at the point of maximum attained film expansion, which is where the film is most wet and thus is where the film is most tender, (that is, at the end of the wet processing stage). The abrasion of the film incident to each tooth-to-tooth film slip is thus minimized, since the least amount of slip between the film and the sprocket occurs when the film is most susceptible to abrasive injuries, and the greatest amount of slip between the film and the sprocket occurs when the film is least susceptible to abrasive injuries. This is in contrast to the usual film sprocket, which, being proportioned for film of maximum contraction, rather than maximum expansion, has the greatest amount of tooth-to-tooth film slip when the film is at its maximum attained expansion, which is when the film is most susceptible to abrasive injuries. With film sprockets according to the arrangement described, injury of the film due to tooth-to-tooth film slip is thus very substantially less than with such usual film sprockets.

Another advantage of the film sprockets according to the arrangement disclosed is that the shock to which the film is subjected during each tooth-to-tooth film slip is minimized, since the magnitude of these shocks, which varies in accordance with the magnitude of the film slip, a minimum when the film is least able to withstand such shocks. This likewise is in contrast to the usual film sprocket.

A further advantage of the film sprockets according to the arrangement disclosed is the elimination of any tendency of the sprocket holes to fail to register with the sprocket teeth, thereby eliminating the possibility of tooth slipping by the film.

An important result of the two sprocket lands 258, 252 adjacent to, and on either side of, the sprocket teeth of sprocket 240 is in eliminating, or at least very substantially reducing, injury to the film due to its engagement with the sprocket along its pitch circle 257. In cutting or otherwise making the tooth disc 242 of the sprocket, it is very difficult to provide an absolutely smooth pitch circle 257. In the absence of sprocket lands 258, 252, the film is drawn down toward and tends to engage the pitch circle 257 so that, as the film slips from tooth to tooth, the sprocket hole webs of the film are dragged across comparatively rough areas to produce objectionable abrasion of the film and substantial frictional losses. When the sprocket lands 258, 252 are provided, the film is maintained out of engagement with the pitch circle 257 so that the objectionable abrasive action does not occur. Furthermore, the frictional losses are minimized as the relative motion between the film and the sprocket during the tooth-to-tooth film slip occurs over the highly finished surfaces of the sprocket lands 258, 252.

Another result of the sprocket lands 258, 252 is that the film is not only maintained out of engagement with the pitch circle 257, but also, that the film is maintained out of engagement with the roots of the teeth 256. This is of advantage, for the reason that it is difficult to form such teeth without small fillets at the roots thereof, and such fillets interfere with the effective cooperation of the film with the teeth. Such fillets also, due to their usual roughness, tend to cause injury to the sprocket holes of the film. Such injuries to the film due to these fillets are eliminated by the sprocket lands 258, 252.

It is to be observed in connection with the film sprocket 240 illustrated, that, since the film engages the teeth of the sprocket along the circumference of the sprocket lands 258, 252 rather than along the pitch circle 257 of the sprocket, the effective pitch circle of the sprocket is the circumference or land circle of the lands 258, 252.

A modified sprocket 270 is illustrated in Fig. 17. Sprocket 270 consists of the hub member 271, the tooth disc 272 and the retaining member 273, similar respectively to 241, 242 and 243 of sprocket 240, with the exception that the lands of sprocket 270 are rotatable with respect to the sprocket. These lands are rotatable rings 274, 275 and 276, preferably of non-corroding material, such as stainless steel, rings 275 and 276 being the sprocket lands adjacent to, and on opposite sides of, the tooth disc 272, and ring 274 being the sound land. A spacing ring 277, smaller in diameter than the other rings, maintains rings 274 and 275 in position. The rotatable lands of sprocket 270 serve to reduce the friction between the film and the sprocket to a value still less than that in the sprocket 240 of Figs. 11–16, and are particularly useful when the sprocket is handling dry film, as in the drier, or in a printer. In all other respects the sprockets 240 and 270 are similar and possess similar advantages.

It is to be understood that while the sprockets 240 and 270 were developed for use as sprockets for the film processing machine of this invention, these sprockets may be used advantageously in all kinds and types of film processing and film handling machines, including printers, and with all types and sizes of film. These sprockets, however, are particularly useful in machines processing or handling substandard single perforated film.

Figs. 18, 19 and 20 are schematic diagrams similar to Fig. 2 illustrating modifications of the film processing machine of Figs. 1–8.

In Fig. 18, the construction is the same as shown in Fig. 2 except that the next to the last roller 17 in the film travel, designated roller 17$^T$, has the same flange diameter as the other roller 17 but has a smaller film engaging diameter, and is secured to shaft 140, as diagrammatically indicated by the set screw 280. (In actual construction, this set screw is positioned between the flanges of the roller, as shown for screw 190 in Fig. 8). Similarly, the last roller 18 in the film travel, designated roller 18$^T$, has the same flange diameter as the other rollers 18 but a smaller film engaging diameter, and is secured to shaft 141, as diagrammatically indicated by the set screw 281. The next to last roller 21$^T$ and the last roller 22$^T$ of the second series of loops correspond to roller 17$^T$ and 18$^T$ of the first series of loops.

As a result of this arrangement, weighted floating roller 19 and its weight 182, acting through the film and the roller 17$^T$, rotate shaft 140 at a rotative speed slightly greater than the rotative speed imparted to the other rollers 17 by the traction between such rollers and the film. This difference in rotative speed is termed shaft lead, and the amount of this shaft lead is governed by the magnitude of the reduction in diameter of the film engaging surface of roller 17$^T$. A reduction which produces a shaft lead of about 4 to 5 percent has been found satisfactory. This shaft lead tends to overcome the inertia of the other rollers 17, the weighted floating roller 19 driving them by virtue of the friction between shaft 140 and the various rollers, independently of the friction between the film and such rollers. This arrangement is particularly effective when the speed of the film at the beginning of a series of loops is increased suddenly, as in a quick start of the machine. Any film slack that may have a tendency to form, under such conditions, at the beginning of a series of loops, is quickly absorbed by the action of weighted floating roller 19 in causing immediate rotation of all the rollers 17.

The action of rollers 18$^T$, 21$^T$ and 22$^T$ is similar to that of roller 17$^T$, so need not be further described. When rollers such as 17$^T$ are used, it is preferred to use both rollers corresponding to 17$^T$ and 18$^T$ in each series of loops, rather than either of such rollers without the other, but either of them may be used without the other if desired.

In Fig. 19 the rollers 17 and the sprocket 20R are mounted on the same shaft, designated 140$^a$. In this case the rollers 17 are positioned above the liquid level LL of the tank. The sprocket 20R is secured to shaft 140$^a$, which is driven from shaft 150 through the gearing 156, as in Fig. 2. All the loop forming film rollers 17 mounted on shaft 140$^a$ are rotatable with respect to the shaft and thus to each other. The pitch circle of the sprocket 20R is substantially less than the diameter of the film engaging surface of all the rollers 17 except the first roller in the path of film travel, designated 17$^{aa}$. The diameter of the film engaging surface of this first roller 17$^{aa}$ is substantially the same as the diameter of the pitch circle of sprocket 20R.

The lower loop forming rollers 18 and the weighted floating roller 19 are the same as in Fig. 2, except that, as mentioned later, the weight 182 may be substantially smaller than that used in the construction of Fig. 2. The cleaner 15 and sprocket 16L are reversed in sequence from that of the machine of Figs. 1-8 (for example, see Fig. 4) and the guide roller 14L is omitted. The second series of film loops in Fig. 19 is similar to the first series therein, the sprocket 24L being secured to shaft 142a upon which the loop forming rollers 21 are rotatably mounted, with the first roller 21aa smaller in diameter than the rest, and of substantially the same diameter as the sprocket 24L.

In all other respects, the construction illustrated in Fig. 19 is the same as that illustrated in Figs. 1-8.

As a result of the construction shown in Fig. 19, the shaft 140a mounting the loop forming rollers 17 is driven directly from the power unit for the machine and at a rotative speed substantially greater than the rotative speed imparted to the loop forming film rollers 17 by the traction between such rollers and the film. This produces, due to the friction between the shaft and the several rollers 17, a torque upon each such roller which, by the traction between such roller and the film, is transformed into a pull upon the film at each such roller 17 tending to produce movement of the film. The film tension in the different loops of film thus diminishes at a lesser rate than in the construction of Figs. 1-8; in other words, the film tension in the different loops of film is more nearly equal. As a consequence, the first loop of film is under more film tension than the corresponding loop in Figs. 1-8, and so also is the film at the preceding sprocket 16L. There is thus less difference in the tension in the film at opposite sides of the preceding sprocket 16L. The latter action reduces the load at such sprocket and thereby reduces the strain of the film in engagement with it.

The motion-producing-action of the rollers 17 may be made to produce such a pull upon the film that the weight 182 suspended from the floating roller 19 may be materially less than it is in the construction of Figs. 1-8. This may be desirable in cases where, with the construction of Figs. 1-8, the weight is of such magnitude as to produce objectionably high pressures between the film and the teeth of the succeeding sprocket 20R, or objectionably high tension in the last loop of film. The weight 182 is nevertheless preferably retained at an appreciable quantity, such as three-eighths of its value in the construction of Figs. 1 to 8, to assist in pulling the film through the series of loops, to insure proper engagement of the film with the succeeding sprocket 20R and to insure adequate traction between the film and one or more rollers 17 immediately preceding the floating roller 19.

In regard to the latter function of the weight 182 suspended from floating roller 19, the weight maintains the last film loop taut, and thus produces friction between the last roller 17 (i. e. the one preceding the roller 19) and the shaft 140a. Assuming shaft 140a to be rotating and that film slack exists at some point in the series of loops which precedes the last roller 17, the shaft 140a rotates the last roller 17 at a speed faster than its normal speed. The traction between the film and the last roller 17, in conjunction with the rotation of the last roller 17, introduces a motion producing pull upon the film at the last roller 17 which is in addition to the motion producing pull due to the weight 182. Together these pulls quickly withdraw enough film from the preceding loop of film to make the film of such preceding loop taut. This action progresses forwardly from loop to loop until the slack point is reached and the film slack pulled through and transmitted to the last loop of film. Thereupon all the rollers 17 which have rotated at abnormal speed slow down to their normal speed.

It is to be observed that the motion producing energy which is in addition to that supplied the film by weight 182 is applied directly to the independently rotatable rollers 17, and by them applied directly to the film, with none of such energy passing through the sprockets or the film. It is also to be observed that such additional energy is applied to the film distributively through the series of loops.

In the construction shown by Fig. 19, therefore, not only does the machine accommodate itself to changes in the sprocket hole pitch of the film occurring during film processing, whatever the character or magnitude of such changes may be and also accommodate itself to deviations from standard sprocket hole pitch which initially exist in different runs of film, as with the construction shown in Figs. 1-8, but motion of the film in a dense media (liquid) is effected at a rapid rate with even less strain upon the film and sprockets than the already small amount of such strain present in the construction of Figs. 1-8, as compared to present commercial film processing machines.

While the construction of Fig. 19 is particularly adapted for use in the wet processing portions of the machine, it may also be used in the dryer. In such case the loop forming film rollers are preferably equipped with ball-bearings, as previously described, to permit relatively free backward rotation of the rollers in the event of a stoppage of the machine and consequent contraction of the film in the dryer while the roller supporting shafts are maintained stationary.

A refinement upon the construction of Fig. 19 consists in increasing the diameter of the shaft 140a where it supports one or more of the first rollers 17 (except roller 17aa, which is essentially an idler, and not a loop-forming film roller). This may be conveniently effected by providing a sleeve over the corresponding portion of the shaft and securing such sleeve to the shaft. The bores of the rollers 17 mounted upon such sleeve are correspondingly increased in diameter. The film engaging diameters of such rollers are unchanged. This arrangement increases the torque applied to each of the rollers on the sleeve as compared to that applied to each of the other rollers on the same shaft, with the result that the sleeve-supported rollers exert a greater pull on the film than the other rollers. This arrangement may be employed when it is desired to have the film at the beginning of a series of loops under a larger tension than that afforded by the construction of Fig. 19. With this arrangement the film tension at the beginning of the series of loops may be made such that it is greater than at the center of the series of loops.

In Fig. 20 is shown another refinement upon the construction of Fig. 19. The constructions are the same, except that each series of loops in Fig. 19 is, in Fig. 20, divided into two series of loops, each with a floating roller and a sprocket at each end of the series. This has been effected by providing a sprocket 285, similar to sprocket 20R, on shaft 140a intermediate its ends, and preferably at a mid-position so that the resulting two series of loops consist of an equal number of loops, and by providing a weighted floating roller 286, similar to roller 19, in the bight of the loop immediately preceding sprocket 285. A sprocket 287 and roller 288 are similarly provided for the series of loops formed by the rollers along shaft 142a. With this arrangement the film tension is very nearly the same in all the loops of film, and a substantial tension is exerted by the film upon the sprocket (such as 16L) at the entering end of the series of loops. Further, each floating roller and its weight contributes a larger proportion of the driving pull upon the film than in Fig. 19, (for the same weight), and the drive of the film is substantially independent of the condition of the upper shaft, such as 140a, that is, whether such shaft is wet or dry or has salts crystallized thereon. This is important, for should the aggregate driving pull upon the film be substantially greater when shaft 140a is dry than it is when the shaft is wet, harmful film tensions might be produced in the film in starting and running the machine before the normal wet condition of the shaft was attained.

As with the construction of Fig. 19, the magnitude of the weight suspended from the floating rollers in Fig. 20 may be relatively small so that the maximum stress upon the film even for high film speeds is small. Thus with a machine according to Fig. 20 handling 16 mm. film normally at 120 film ft. per minute the maximum film stress is about 0.5 pound.

It is to be observed that although the constructions of Figs. 19 and 20 provide more relative motion between each roller-supporting shaft and the set of film rollers thereon than in the construction of Figs. 1–8, there is still substantially less wear of the shaft and of the rollers thereon than when the shafts are nonrotatable. Maintenance difficulties and expense are thus about as small with the constructions of Figs. 19 and 20 as they are with the constructions of Figs. 1–8.

While this invention has been illustrated in connection with roller supporting shafts having axes relatively fixed during running of the film, these shafts may be relatively movable in response to variations in the tension of the film as it is fed through the machine. For example, the end bearings of one or more of the lower shafts may be held down against an adjustable stop by adjustable spring tension or pressure or these end bearings may be floated in sponge rubber or the like. The shaft with its rollers may then be lifted a variable amount in the event the film tension exceeds a certain amount and will tend to sink back as the film tension is relieved, for instance by the raising of the floating roller. With this adjustment the variations in film tension may be accompanied by repeated alternations of the yielding movements back and forth between the roller supporting shaft and the corresponding floating roller.

What I claim is:

1. A machine for moving a continuous length of film through a processing step, means for receiving the film and forming it into a series of loops of constant length, a floating loop-forming means at the end of said loops of constant length providing a loop of variable length and substantially constant tension, and driving means adapted to maintain a tension on the film at the end of said loop of variable length, said first loop forming means comprising spaced shafts rotatably mounted on fixed axes and film rollers rotatably mounted on said shafts.

2. In a machine for processing continuous film having sprocket holes along at least one side thereof; two spaced series of loop-forming film rollers rotating on fixed axes and around which the film passes in spiral fashion to form a series of vertical film loops of fixed dimensions; two sprockets, the first engaging the film just before it enters said series of loops and, when rotating, transferring film thereto, and the second engaging the film after it leaves said series of loops; a weighted roller having a range of vertical motion positioned at the bottom of a supplementary loop between the end of said series of loops and said second sprocket, the weight associated with the said roller producing a tension in said film between said sprockets tending to pull said film through said series of loops; and means, including non-slipping coupling means coupling said sprockets, for rotating said sprockets.

3. In a machine for processing continuous film having sprocket holes along at least one side thereof; an input sprocket over which said film passes; two rotatably mounted vertically spaced shafts having stationary parallel axes; a plurality of film rollers mounted on each shaft so that each film roller is freely rotatable relative to each of the other film rollers on the same shaft, said film passing from said input sprocket around said film rollers in spiral fashion to form a series of loops; a floating roller at the end of said series of loops around which said film passes to form a supplementary loop at the end of said series of loops, said floating roller having a substantial range of motion for lengthening and shortening said supplementary loop; a weight suspended from said floating roller for tensioning said film and tending to pull it through said series of loops to said supplementary loop; an output sprocket over which the film from said supplementary loop passes, and means for driving said input and output sprockets in unison so that the same number of sprocket holes of film are passed by each of said sprockets in a given time.

4. A machine as described in claim 1 having each shaft of substantially uniform diameter and having the loop-forming film rollers on each of the shafts of substantially the same shaft hole diameter and substantially the same film engaging diameter as every other loop-forming film roller on the same shaft.

5. A machine as described in claim 3 having each shaft of substantially uniform diameter and having the loop-forming film rollers on each of the shafts of substantially the same shaft hole diameter and substantially the same film engaging diameter as every other loop-forming film roller on the same shaft, and having each loop-forming film roller freely rotatable upon its shaft.

6. A machine as described in claim 3 in which the output sprocket serves also as the input sprocket for a succeeding series of loops.

7. A machine as described in claim 3 having one of the sprockets mounted on and connected to the upper of said shafts so as to drive it in the same direction as the film rollers thereon.

8. A machine as described in claim 3 having one of the sprockets mounted on and connected to the upper of said shafts so as to drive it in the same direction as the loop-forming film rollers thereon, the diameter of the effective pitch circle of such sprocket being substantially less than the film engaging diameter of said loop-forming film rollers so that the rotative speed of said upper shaft is substantially greater than the normal rotative speed of said loop-forming film rollers.

9. In film-feeding apparatus, the combination with a series of loop-forming rollers mounted on shafts having their axes relatively fixed, said rollers being relatively freely rotatable with relation to each other, means for feeding film to said rollers at a predetermined rate, means for drawing the film from the last of said rollers comprising a yielding tension means adapted to impose substantially uniform tension on the film leaving said rollers, and means for feeding the film from said yielding tension means at a predetermined rate maintaining substantially uniform tension on said yielding tension means so as to impose substantially invariable drawing tension on the film from said loop-forming rollers.

10. The apparatus as set forth in claim 9 in which the yielding tension means includes a weighted free-axis roller and a fixed-axis rotating member, with the film, on leaving the last of said rollers, adapted to pass under said free-axis roller and over said fixed-axis rotating member to form a loop of film having the free-axis roller suspended therein.

11. The apparatus set forth in claim 9 in which the film is perforated and the means for feeding the film from the yielding tension means includes a toothed sprocket, having its teeth meshing with the perforations of the film.

12. The apparatus set forth in claim 9 in which the film is perforated, a common driving means for the two film feeding means is provided for operating said film feeding means in unison and the shaft for one set of the loop forming rollers is connected to the driving means to be driven in the same direction as that in which the rollers thereon rotate, with said shaft having a toothed sprocket secured thereto and its teeth meshing with the perforations of the film to serve as one of the film feeding means.

13. The apparatus set forth in claim 9 in which a common driving means for the two film feeding means is provided for operating said film feeding means in unison and the shaft for at least one set of the loop forming rollers is connected to the driving means to be driven in the same direction as that in which the rollers thereon rotate and at a speed substantially greater than that of said rollers, the rollers themselves engaging the film with substantially no slippage, so that there is substantial forward slippage of the shaft with respect to each individual roller thereon which tends to aid the rotation of the rollers.

14. The apparatus set forth in claim 9 in which the film is perforated, a common driving means for the two film feeding means is provided for operating said film feeding means in unison, and one of the film feeding means includes a toothed sprocket having its teeth meshing with the film perforations, the sprocket being mounted upon and secured to one of the loop forming roller shafts and having its pitch diameter substantially less than the film engaging diameters of rollers on said shaft and said shaft being connected to the driving means to be driven thereby so that, while said rollers themselves engage the film with substantially no slippage, there is substantial forward slippage of the shaft with respect to each individual roller thereon which tends to aid the rotation of the rollers.

15. In a machine for processing continuous film having sprocket holes along at least one side thereof; two spaced series of loop-forming film rollers mounted on shafts having stationary axes and around which the film passes in spiral fashion to form a series of loops, the rollers on each shaft being independently and freely rotatable relative to the other rollers on such shaft; an input sprocket meshing with the film at the beginning of said series of loops; a floating roller at the end of said series of loops around which the film passes to form a supplementary loop of film at the end of said series of loops; means possessing potential energy connected to said floating roller so that said potential energy produces tension in said film and tends to pull it through said series of loops and transfer it to said supplementary loop; an output sprocket meshing with the film after it leaves said supplementary loop, one of said sprockets being mounted upon and secured to one of said shafts, with the pitch diameter of said sprocket substantially smaller than the film-engaging diameters of the rollers on said shaft; and means, including non-slipping coupling means coupling said sprockets, rotating said sprockets in unison so that they pass an equal number of sprocket holes of film in the same time.

16. A machine for processing continuous film having sprocket holes along at least one side thereof and wherein the sprocket hole pitch of the film entering the machine is subject to vary as between different portions thereof and wherein the sprocket hole pitch of the film being processed in the machine is subject to vary during the processing, said machine comprising a film sprocket at each of a plurality of stations successively traversed by the film during its processing, means driving all of said film sprockets in unison so that all film sprockets pass the same number of sprocket holes of film in a given time regardless of the sprocket hole pitch of the film, and means forming the film between successive sprockets into a plurality of film loops of constant length and into at least one film loop of variable length which is positioned to be traversed by the film after the film has traversed at least some of the film loops of constant length, said means including upper and lower sets of loop-forming film rollers in which the rollers in each set are relatively freely rotatable with relation to each other, so that each roller is free to rotate at the same peripheral speed as the linear speed of the film in engagement therewith regardless of the differences in the lineal speeds of the film from point to point incident to said variations in the sprocket hole pitch of the film, and said means also including a weighted floating roller positioned in the lower bight of the film loop of variable length and normally disengaged from both its upper and lower limits of travel for all changes in the lineal length of the film between adjacent sprockets incident to said variations in the sprocket hole pitch of the film, so that said weighted floating roller provides tension in the film for withdrawing the film from the film loops preceding it and, by its change of vertical position, absorbs said changes in lineal length of film, whereby said film is moved from the first to the last of said stations without subjecting it to excessive tension.

JESSE M. BLANEY.